United States Patent
Miyazaki et al.

(10) Patent No.: US 7,134,021 B2
(45) Date of Patent: Nov. 7, 2006

(54) METHOD AND SYSTEM FOR RECOVERING THE VALIDITY OF CRYPTOGRAPHICALLY SIGNED DIGITAL DATA

(75) Inventors: Kunihiko Miyazaki, Yokohama (JP); Hiroshi Yoshiura, Tokyo (JP); Seiichi Susaki, Yokohama (JP); Ryoichi Sasaki, Fujisawa (JP); Kazuo Takaragi, Ebina (JP); Hisashi Toyoshima, Hachioji (JP); Takeshi Matsuki, Musashino (JP)

(73) Assignee: Hitachi, Ltd. (JP)

( * ) Notice: Subject to any disclaimer, the term of this patent is extended or adjusted under 35 U.S.C. 154(b) by 950 days.

(21) Appl. No.: 09/816,777

(22) Filed: Mar. 22, 2001

(65) Prior Publication Data

US 2002/0023221 A1 Feb. 21, 2002

Related U.S. Application Data

(63) Continuation-in-part of application No. 09/693,713, filed on Oct. 19, 2000.

(30) Foreign Application Priority Data

Oct. 22, 1999 (JP) .......................................... 11-301216
Mar. 17, 2000 (JP) ...................................... 2000-081712

(51) Int. Cl.
*G06F 17/00* (2006.01)

(52) U.S. Cl. ........................ 713/178; 713/179; 713/181
(58) Field of Classification Search .......... 713/176–187
See application file for complete search history.

(56) References Cited

U.S. PATENT DOCUMENTS 5,136,646 A  8/1992  Haber et al.
5,905,800 A  5/1999  Moskowitz et al.
5,956,404 A  9/1999  Schneier et al.
6,131,162 A  10/2000  Yoshiura et al.

FOREIGN PATENT DOCUMENTS

JP  3278721 B  2/2002

OTHER PUBLICATIONS

Efficient key agreement and signature schemes using compact representations in GF(p/sup 10/) Giuliani, K.J.; Guang Gong; Information Theory, 2004. ISIT 2004. Proceedings. International Symposium on , Jun. 27–Jul. 2, 2004 pp.:13.*
An efficient distributed group key management algorithm Rahul, S.; Hansdah, R.C.; Parallel and Distributed Systems, 2004. ICPADS 2004. Proceedings. Tenth International Conference on , Jul. 7–9, 2004 pp.:230–237.*
An efficient key–evolving signature scheme based on pairing Yuefei Zhu; Dan Xu; Distributed Computing Systems, 2004. FTDCS 2004. Proceedings. 10th IEEE International Workshop on Future Trends of , May 26–28, 2004 pp.:68–73.*

(Continued)

*Primary Examiner*—David Jung
(74) *Attorney, Agent, or Firm*—Townsend and Townsend and Crew LLP

(57) ABSTRACT

According to the present invention, techniques, including a method and system, for restoring and/or validating data and/or associated signature log entries are provided. One embodiment of the present invention provides a method for validating a restored message, having an entry generated in a signature log for a message, where the entry includes cryptographic information associated with the message; Next, when said message is lost, the restored message is generated responsive to a request; and the restored message is validated using the signature log. In another embodiment a method for validating a selected log entry by using a signature log having a plurality of recorded log entries is provided. The method includes: computing a cryptographic value for the selected log entry; and determining if the cryptographic value is part of another recorded log entry.

40 Claims, 18 Drawing Sheets

OTHER PUBLICATIONS

Nagai Yasuhiko et al., "Method for Generating Electronic Data Able to be Authenticated," Patent Abstract of Japan 2000–078125, Mar. 3, 2000, p. 1, Japan.

"Digimarc Watermarking Guide," PDF Version, pp. 5.

"Clear, Secure, and Portable Visual Marks for the Cyber World," Nov. 27, 2000, pp. 1–8.

Hal Abelson et al., "The Risks of Key Recovery, Key Escrow, & Trusted Third Party Encryption," http://www.cdl.org/crypto/risks98/, 1998, pp. 1–20.

Jack Lacy et al., "Intellectual property protection systems and digital watermarking," Optics Express, vol. 3, No. 12, Dec. 7, 1998, pp. 478–484.

* cited by examiner

EXAMPLE COMPUTER

MESSAGE FORMAT (410)

MESSAGE FORMAT WITH TIMESTAMP (510)

ANOTHER SIGNATURE LOG WITH TIMESTAMP

VALIDATING LOG ENTRIES-BACKWARD CHAINING

CHECKPOINTING (e.g., PUBLISHING OR NOTARY) LOG ENTRY

NOTARY WITH LINKING

RECOVERY SERVER DETERMINING IF SIGNATURE LOG ENTRY HAS BEEN CHECKPOINTED

EVIDENCE COLLECTION
SERVER COLLECTING DATA

EVIDENCE COLLECTION
SERVER RECOVERING DATA

RECOVERY SERVER RECOVERING USER SIGNATURE LOG ENTRY

RECOVERY SERVER RECOVERING USER DATA BETWEEN TWO POINTS IN TIME

METHOD AND SYSTEM FOR RECOVERING THE VALIDITY OF CRYPTOGRAPHICALLY SIGNED DIGITAL DATA

CROSS-REFERENCES TO RELATED APPLICATIONS

This is a Continuation in Part of U.S. patent application Ser. No. 09/693,713, "Digital Signing Method," by Kunihiko Miyazaki, et. al., filed Oct. 19, 2000, which claims priority from Japanese Application Nos. 11-201216, filed Oct. 22, 1999, and 2000-081712, filed Mar. 17, 2000, the disclosures of which are incorporated herein by reference in their entireties.

BACKGROUND OF THE INVENTION

The present invention generally relates to recovering data and more specifically to restoring and/or validating digitally signed data.

The use of the Internet for both business and personal communications has grown dramatically over the past few years, especially in the area of E-commerce. This large increase in message traffic along with the increased complexity of hardware and software, has increase the chance of losing data. Many systems today provide for back-up, as the number of computer crashes is rising.

While there are many conventional data recovery methods, the problem arises for the user in that how does she know if the information recovered has been tampered with? Especially when there have been several well publicized accounts of computer break-ins. One conventional technique to detect if there has been tampering to a message, and hence to the recovered message, is a digital signature. The US government has established a standard for digital signatures, which is given in Federal Information Processing Standards Publications (FIPS PUB) 186, which is incorporated by reference in its entirety.

FIG. 1 illustrates a conventional digital signature technique. The sender of a Message (M) 110 has a Signature Generation Unit 112. The receiver of the message 110 has a Signature Verification Unit 114. The Signature Generation Unit 112 takes message 110 and performs a secure hash 116 on M 110 to produce H(M) 118. H(M) 118 and Private Key 120 are inputted into Digital Signature Algorithm (DSA) Sign 122 to produce a digital signature for H(M) 118, i.e., Sign(H(M)) 124. M 110 and Sign(H(M)) 124 are sent from Signature Generation Unit 112 at a user sender to Signature Verification Unit 114 at a user receiver. M 110 at Signature Verification Unit 114 is then hashed 130 to produce H(M) 132. The secure hash 130 is the same function as secure hash 116. H(M) 132 and Sign(H(M)) 124 are inputted into DSA Verify 136 along with Public Key 134 to validate the message content. A "no" result means the message 110 has been tampered with, while a "yes" result indicates, but does not insure, no tampering. In addition the digital signature authenticates the message, i.e., it assures the recipient that the message is from the source that the message claims to be from.

However, the digital signature relies on a known algorithm that assumes that is very difficult but not impossible to crack. This assumption is becoming weaker and weaker with the rapid increase in computer power. In addition the digital signature assumes that the private key is secret. If the private key is compromised, the security is lost in present, as well as, recovered data. Thus there needs to be better techniques to validate recovered data.

SUMMARY OF THE INVENTION

According to the present invention, techniques, including a method and system, for restoring and/or validating data and/or associated signature log entries are provided. In one embodiment the data includes digitally signed user messages, and the associated signature log entries are related, for example, linked. Each signature log entry, except the first, uses data from a previous signature log entry. The data from a previous signature log entry is used as one input in forming the present signature log entry's digital signature. Thus a chaining or hysteresis signature is generated. In this embodiment, after a lost message is restored, the signature log is used to validate the message by comparing the digital signature associated with the message with the corresponding signature log entry. The security of the signature log may be increased by publishing selected entries in a public media such as a public printed publication, for example, a newspaper, newsletter, Web site, magazine, or periodical. The message may be further validated by checking the consistency of the signature log from the published entry back to the message's signature log entry.

While some embodiments show the use of the hysteresis signature for messages, the invention is not limited to messages. For example, the validity of a series of business documents on a business computer system, after restoring the data from back-up medium, may use the business signature log and hysteresis signature associated with each document to validate the data. A user may also want to validate restored back-up data, for example, previous E-commerce purchases, on the user's own computer system.

One embodiment of the present invention provides a method for validating a restored message, having an entry generated in a signature log for a message, where the entry includes cryptographic information, for example, a digital signature, associated with the message; Next, when said message is lost, the restored message is generated responsive to a request; and the restored message is validated using the signature log.

A second embodiment of the present invention provides a system for recovering and validating user information. The system includes a user system having a signature log, where the signature log has cryptographic information associated with the user information; a recovery system coupled with the user system via a communications network for restoring user information; and a validity system coupled with the user system via said communications network for validating restored user information using the signature log.

A third embodiment of the present invention provides a system for determining if a user message is valid, the system includes: a user computer system having a log, the log having a log entry related to a message sent by the user, where the log entry has a digital signature having information related to a previous log entry of the log; and a validation unit coupled to the user computer system for validating the user message using the log.

A forth embodiment of the present invention provides a computer readable data transmission medium containing a data structure for validating message information. The data structure includes: a first portion having a hash of a user message or a user message itself; a second portion having a hash of a signature log entry; and a digital signature based on the first portion and the second portion.

A fifth embodiment of the present invention provides a method, using a computer, for generating a signature log having a plurality of log entries. First, a first log entry is generated. The first log entry has a first cryptographic value associated with a first user message; and next a second log entry is generated. The second log entry having a second cryptographic value associated with the first log entry, a third cryptographic value associated with a second user message, and a digital signature.

A sixth embodiment of the present invention provides in a computer system, a method for validating a selected log entry by using a signature log having a plurality of recorded log entries. The method includes: computing a cryptographic value for the selected log entry; and determining if the cryptographic value is part of another recorded log entry.

A seventh embodiment of the present invention provides a system for preventing repudiation of a transaction by one of a plurality of user computer systems. The system includes: a first user computer system; a second user computer system performing the transaction with the first user; and a log chain crossing computer responsive to a request by either the first or the second user to record the transaction; the record including a hysteresis signature of the transaction.

A eight embodiment of the present invention provides a method using a computer system for registering a log entry of a user by an officially recognized entity, for example, a notary (with or without linking). The method includes: maintaining a signature log chain by the officially recognized entity, where a first log entry of the signature log chain is related to a previous second log entry of the signature log chain; receiving from the user a user log entry; generating a cryptographic value associated with the user log entry; and generating a third log entry of the signature log chain, wherein the third log entry includes the cryptographic value.

An ninth embodiment of the present invention provides a method for validating a user data item by a computer system using a user's signature log. The computer system receives the user's signature log and validates that a cryptographic value associated with the user data item is in a first log entry in the user's signature log. Next, the computer determines a second log entry in the user's signature log that is checkpointed and then verifies the first log entry by back chaining from the second log entry to the first log entry; and a result is returned to the user.

A tenth embodiment of the present invention provides a method, using a computer system, for recovering a data item between two points in time. The method includes: receiving a request from a user to recover data between two points in time, receiving from a data recovery unit the data item and associated signature log entry; validating the data item using the associated signature log entry; and if the data item is validated, sending the data item to the user.

An eleventh embodiment of the present invention provides system for validating a user message the system includes: an input module for receiving a signature log from a user, where the signature log comprising a plurality of related log entries; a cryptographic module for generating a cryptographic value from the user message; and a verifying module for validating the cryptographic value is in the signature log.

A twelfth embodiment provides a computer program product for validating a restored message, having: code for generating an entry in a signature log for a message, where the entry includes cryptographic information associated with the message; when the message is lost, code for generating the restored message responsive to a request; code for validating the restored message using the signature log; and a computer usable medium for embodying the above codes.

Another embodiment provides a computer data signal embodied in a carrier wave for validating a restored message, having: program code for generating an entry in a signature log for a message, where the entry includes cryptographic information associated with the message; when said message is lost, program code for generating the restored message responsive to a request; and program code for validating the restored message using the signature log.

These and other embodiments of the present invention are described in more detail in conjunction with the text below and attached figures.

DESCRIPTION OF THE SPECIFIC EMBODIMENTS

Figure 2:
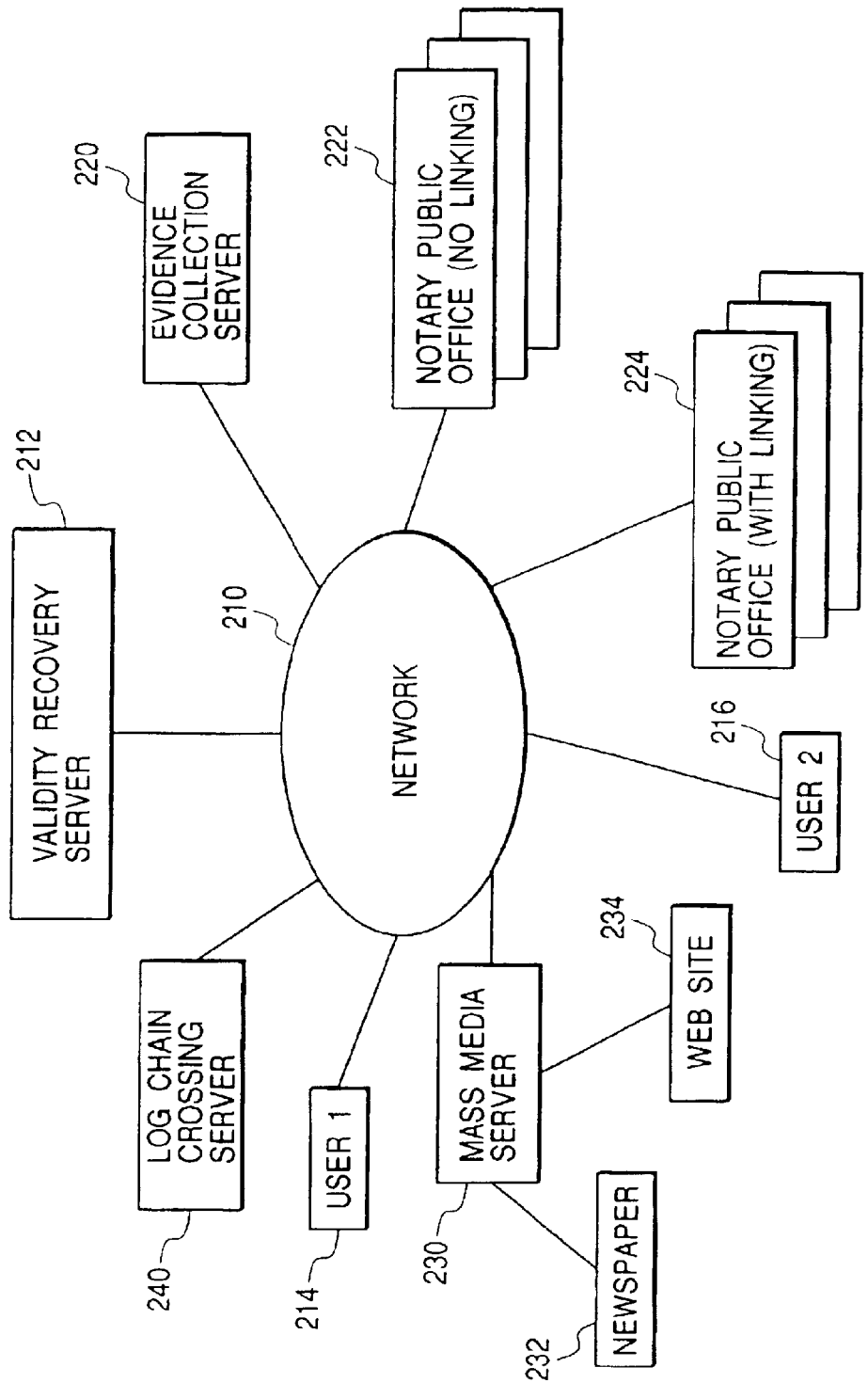
FIG. 2 shows an embodiment of the Validity Recovery System for the present invention.

FIG. 2 shows an embodiment of the validity recovery system of the present invention. The system includes a Validity Recovery Server 212, and a User__1 214 coupled together via network 210. Optionally, one or more of the following may be included and coupled together via network 210: a User__2 216, an Evidence Collection Server 220, a Notary Public Office with no linking 222, a Notary Public Office with linking 224, a Mass Media Server 230 and a Log Chain Crossing Server 240. User__1 214 and User__2 216 are only examples of potential users, other embodiments include more than two users. Mass Media Server 230 includes a Newspaper 232 and/or a Web site 234.

The Validity Recovery Server 212 receives a recovered message and/or signature log entry from the Evidence Collection Server 220 and validates the message and/or the signature log entry associated with the message. A user or Evidence Collection Server 220 may request publishing selected signature log entries via the Mass Media Server 230 and registers other selected signature log entries with a Notary Public office with no linking 222, or a Notary Public office with linking 224. This registering or publishing is checkpointing the signature log entry for later use in validating a particular previous signature log entry.

The Evidence Collection Server 220 collects and stores in a database (DB) information associated with user messages sent over network 210. The information includes a signature log entry associated with the message and who the message is sent to. In this embodiment the Evidence Collection Server 220 maintains in its DB a copy of all the users' signature log entries and thus acts as a back-up to a user's signature log. To recover a message the Evidence Collection Server 220 knows who received the message and tries to recover the message from the receiver. In an alternative embodiment, the Evidence Collection Server 220 maintains a copy of some or all the messages sent by the users and supplies the Validity Recovery Server 212 the back-up copy on request. In another embodiment the Evidence Collection Server 220 includes a search engine, which upon request by the Validity Recovery Server 212, searches via network 210 for a back up copy of the lost message. If the search engine finds the backup copy The Evidence Collection Server retrieves the backup copy and forwards it to the Validity Recovery Server 212.

The Notary Public Offices 222 and 224 are either a licensed public or private notary service or any officially recognized entity, which maintains a signature log, either using the hysteresis signature, i.e., with linking, or a conventional log book, i.e., no linking. Thus a user may register periodically selected entries in her signature log with the notary service. These checkpoints may be used to validate a particular previous signature log entry.

Hysteresis signature as used herein is a security mechanism using digital data comprising a first cryptographic information related to a message and a second cryptographic information related to at least one previous hysteresis signature. An example of the first cryptographic information would be the result of encrypting the message. Another example of the first cryptographic information includes a digital signature formed, in part or wholly, from the message. An example of the second cryptographic information, includes the result of encrypting digital data of at least one previous hysteresis signature, where initially the first hysteresis signature may be a predetermine value. Using the above definition, one example of a hysteresis signature includes one log entry in a chain of log entries, where in the chain of log entries, each log entry, except for the first log entry, is dependant upon the previous log entry.

The Mass Media Server 230 publishes to a large audience selected user signature log entries upon request of either a user or the Evidence Collection Server 220. The publishing of a signature log entry, makes it difficult to tamper with the log entry after it has been published. Like registering a log entry with a notary, the publishing of a signature log entry checkpoints the entry and may be used to validate a particular previous signature log entry. Two examples of publishers are given, a newspaper publisher 232 and a Web site 234. Other examples of publishers may include, magazine, book, periodical, newsletter, or conference proceeding publishers.

Log Chain Crossing Server 240 is used by, for example, User__1 214 and User__2 216, when a mutual transaction, for example, a contact, a sale of a good, a loan, or an E-commerce transaction, occurs. The Log Chain Crossing Server 240 keeps a copy of the transfer of messages in its signature log using the hysteresis signatures. If a dispute latter arises on the transaction, the Log Chain Crossing Server 240 acts as a witness to the transaction. This prevents either party from repudiating the transaction. In an alternative embodiment the Log Chain Crossing Server 240 facilities the transfer of transaction or exchange messages between User__1 214 and User__2 216, but does not maintain a copy. It is up to each user to maintain their own copy.

Figure 3:
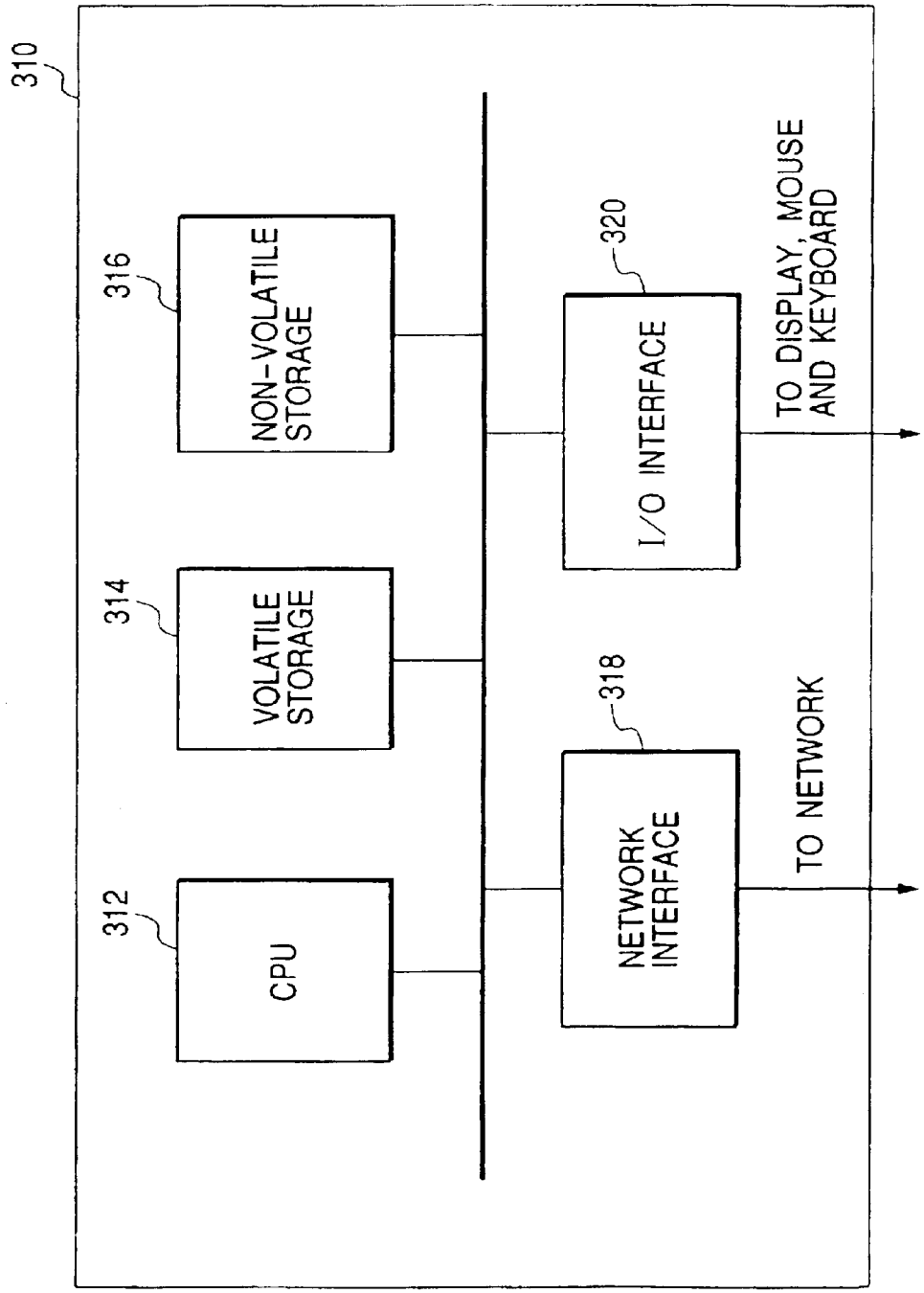
FIG. 3 shows an example computer system that may represent one embodiment of the computer systems shown in FIG. 2.

FIG. 3 shows an example computer system 310 that may represent one embodiment of each computer system shown in FIG. 2. These FIG. 2 computer systems include: the Validity Recovery Server 212, the User__1 214, the User__2 216, the Evidence Collection Server 220, the Notary Public Office with no linking 222, the Notary Public Office with linking 224, the Mass Media Server 230 and the Log Chain Crossing Server 240. The computer system 310 includes a central processing unit (CPU) 312, volatile storage 314 for temporary storage (for example RAM), a non-volatile storage 316, for example, hard disk, CD-ROM, or floppy disk, for storing data and software, a network interface 318 to connect to network 210, an I/O interface 320 to connect to a display, mouse and keyboard, and a bus 325 which connects the aforementioned components together. Another hardware embodiment may include for the servers a multi-processor Microsoft NT™ system with RAID disk drives and for the user a personal computer (PC) with a Microsoft Windows™ operating system.

Figure 4:
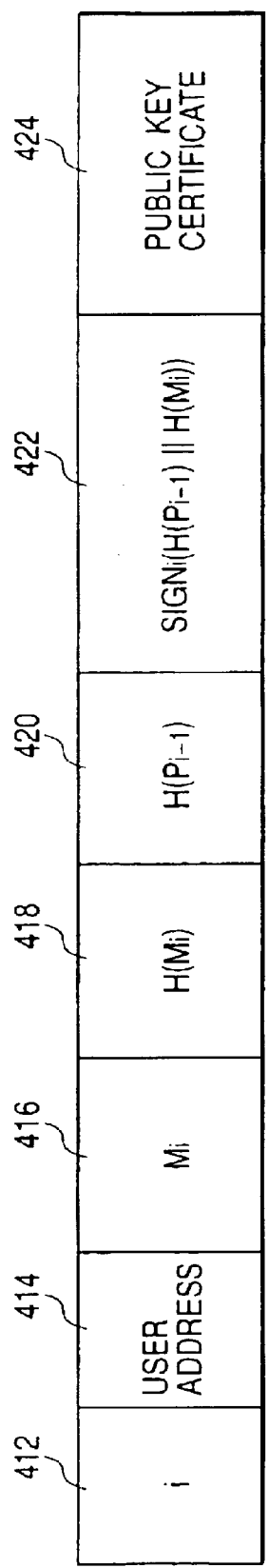
FIG. 4 shows a message format of one embodiment of the present invention.

FIG. 4 shows a message format 410 of one embodiment of the present invention. The message is sent from a user, for example, User__1 214, to another user, for example, User__2 216, over Network 210. The message format 410 includes an index number "i" 412, the user address of the source 414, for example, User__1 214. In addition the address of the destination (not shown) is also included, for example, User__2 216. The message content, $M_i$, a hash of the message content, $H(M_i)$ 418, a hash of the preceding (i-1) log entry, $H(P_{i-1})$, 420, a digital signature of the concatenation of $H(P_{i-1})$ and $H(M_i)$, i.e., $Sign_i(H(P_{i-1}) \| H(M_i))$ 422, and a Public Key Certificate 424. The message content, $M_i$, may include, for example, text, HTML, XML, images, video clips, audio clips, digital data, or programs. In one embodiment the Message content ($M_i$) includes the attachments. In an alternate embodiment the attachments are excluded The digital signature, $Sign_i(H(P_{i-1}) \| H(M_i))$ 422, is a hysteresis signature in that the information from the preceding log entry, $P_{i-1}$, is included in the digital signature.

Figure 5:
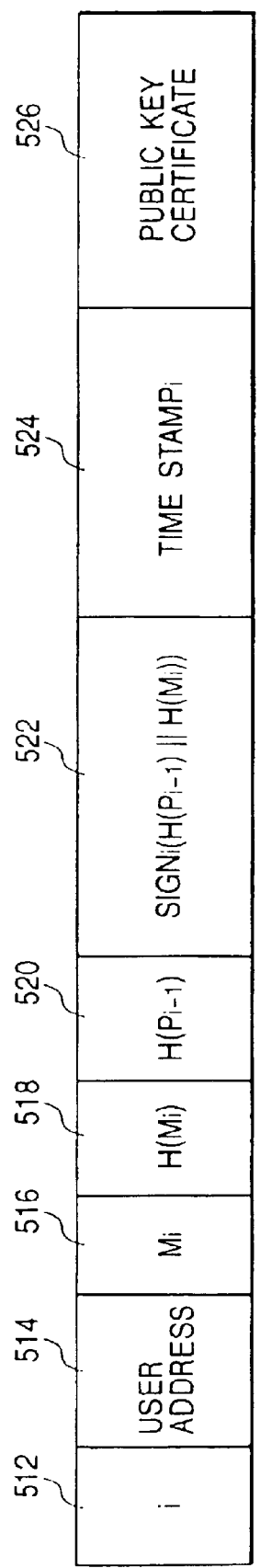
FIG. 5 shows another message format of another embodiment of the present invention.

FIG. 5 shows another message format 510 of another embodiment of the present invention. The format of the message is similar to FIG. 4, except with the addition of a $Timestamp_i$ field 524. In one embodiment the $Timestamp_i$ field 524 is the time the message is sent. In other embodiments the $Timestamp_i$ field 524 may be the time the message is created or the time the message is received.

Figure 6:
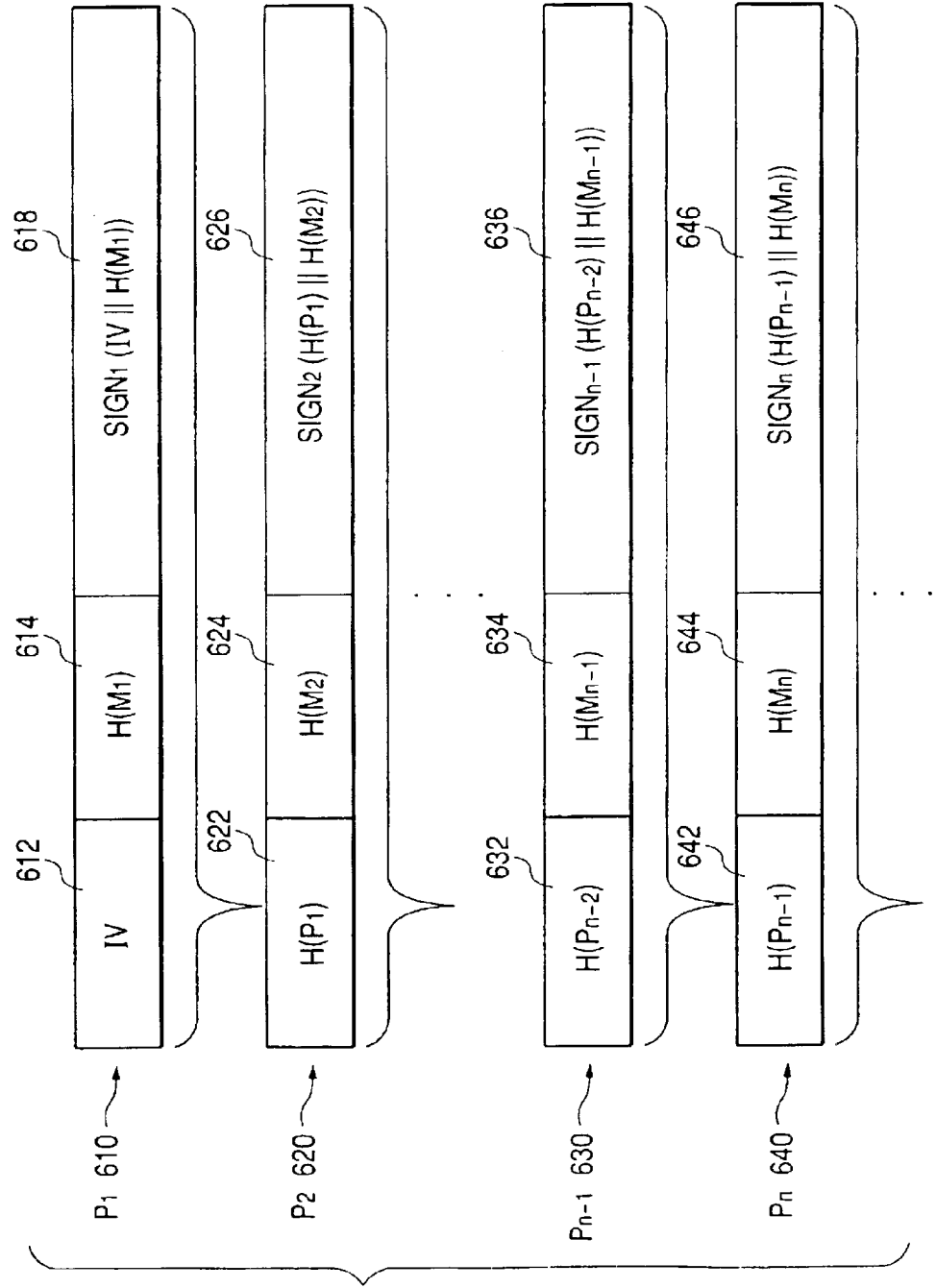
FIG. 6 shows an example of a user's signature log of an embodiment of the present invention.

FIG. 6 shows an example of a user's signature log of an embodiment of the present invention. Each user maintains a signature log of messages sent and received in chronological order. The signature log entries are represented by the symbol $P_i$, for example, $P_1$ 610, $P_2$ 620, $P_{n-1}$ 630 and $P_n$ 640. The first signature log entry $P_1$ 610 has field "IV" 612, which is a constant set at a predetermined value. The next field $H(M_1)$ 614 is a hash of the first message content, $M_1$. And the third field $Sign_1(IV \| H(M_1))$ 618 is a digital signature of IV concatenated with $H(M_1)$. The next signature log entry $P_2$ 620 has field $H(P_1)$ 622, which is a hash of the preceding signature log entry $P_1$ 610. The next field $H(M_2)$ 624 is a hash of the second message content, $M_2$. And the third field $Sign_2(H(P_1) \| H(M_2))$ 626 is a digital signature of $H(P_1)$ concatenated with $H(M_2)$. The nth signature log entry is $P_n$ 640, which includes information from the preceding signature log entry $P_{n-1}$ 630 in $H(P_{n-1})$ 642. The nth message content, $M_n$, is hashed to give $H(M_n)$ 644. And the digital signature is a hysteresis signature, $Sign_n(H(P_{n-1}) \| H(M_n))$ 646. Thus $P_n$ equals $[H(P_{n-1}) \| H(M_n) \| Sign_n(H(P_{n-1}) \| H(M_n))]$. The (n-1 signature log entry is $P_{n-1}$ 630, which includes information from the preceding signature log entry $P_{n-2}$ in $H(P_{n-2})$ 632. The (n-1)th message content, $M_{n-1}$, is hashed to give $H(M_{n-1})$ 634. And the digital signature is again a hysteresis signature, $Sign_{n-1}(H(P_{n-2}) \| H(M_{n-1}))$ 636. Thus each log entry, $P_i$, is chained backward to the previous log entry, $P_{i-1}$. This chaining greatly increases the difficulty of forging the digital signature, as one needs to know past as well as present information. In another embodiment a user may have a separate send log and receive log.

Figure 7:
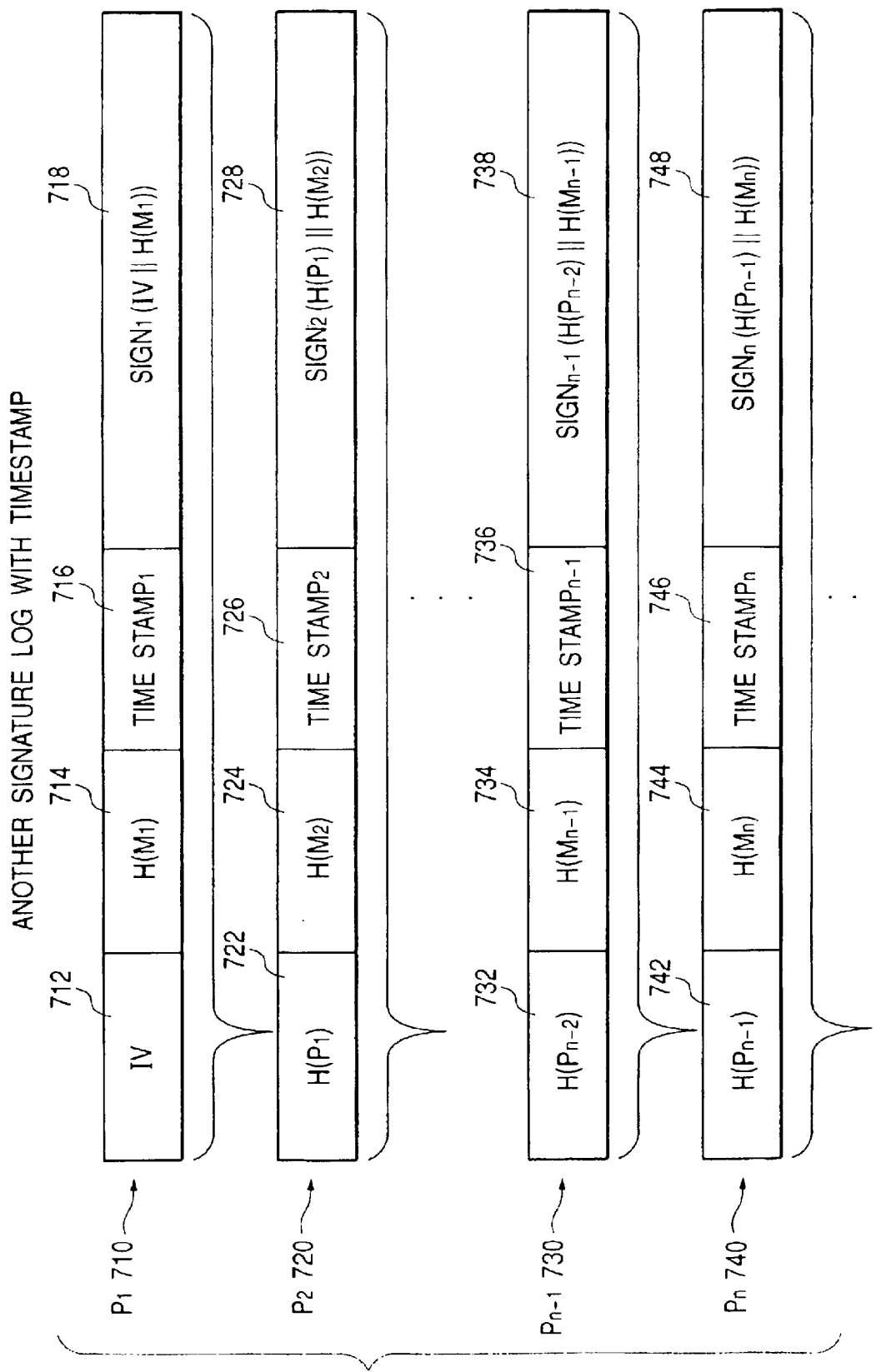
FIG. 7 shows an example of a user's signature log of another embodiment of the present invention.

FIG. 7 shows an example of a user's signature log of another embodiment of the present invention. The signature log entries are similar to FIG. 6, except there is an additional timestamp field in each log entry, for example, 716, 726, 736, and 746. The timestamp field is the same as that in FIG. 5.

Figure 8:
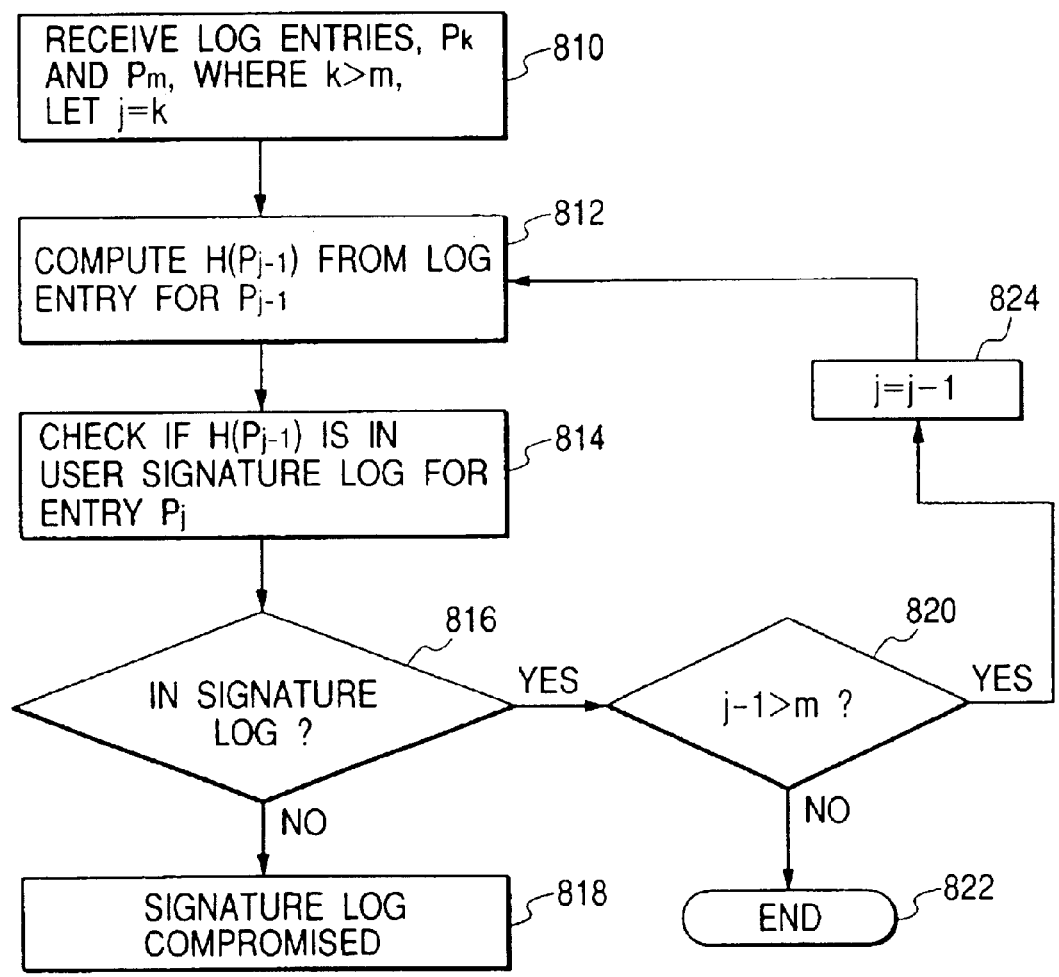
FIG. 8 gives a flowchart showing the validation of log entries in a signature log file of an embodiment of the present invention.

FIG. 8 gives a flowchart showing the validation of log entries in a signature log file of an embodiment of the present invention. Given two log entries $P_k$ and $P_m$, where k>m, the calculated hashes of $P_m$ through $P_{k-1}$ must be in the user's signature log file, otherwise the signature log has been compromised. At step 810 $P_k$ and $P_m$ are received by, for example, the Validity Recovery Server 212. j>k and a temporary iteration index, "j" is initially set to k. At step 812 $H(P_{j-1})$ is computed by finding the hash of $P_{j-1}$ or:

$$H(P_{j-1})=H[H(P_{j-2}) \| H(M_{j-1}) \| Sign_{j-1}(H(P_{j-2}) \| H(M_{j-1}))]$$

Step 814, then checks if the computed $H(P_{j-1})$ is in the user's signature log for $P_j$. If the answer is no, then the signature log has been compromised at step 818. If the answer is yes, then j-1 is tested if it is greater than m (step 820). If no, then the process is complete 822 and the signature log entries $P_m$ through $P_{k-1}$ have been validated (assuming that $P_k$ was previously validated). If yes, then j is decremented by one (step 824) and the process goes to step 812 to compute $H(P_{j-1})$.

For example, let k=5 and m=3. At step 810 j=k=5. At step 812, $H(P_4)$ is computed using the signature log entry for $P_4$. Next as indicated from FIG. 6, $H(P_4)$ is checked in the user's signature log for $P_5$. If the answer is yes, then $P_4$ has been validated, assuming that $P_5$ has been previously validated. As (5-1)>3 (step 820), j is decremented by one (j=4 at step 824). At step 812 $H(P_3)$ is computed from the log entry for $P_3$ and the calculated $H(P_3)$ is checked against the corresponding field in log entry $P_4$. If $H(P_3)$ is in the signature log, then $P_3$ has been validated and at step 820, (4-1)>3 is checked. As the answer is no, the process is finished at step 822 and the results are that $P_3$ and $P_4$ have been validated. $P_5$ could have been previously validated by checkpointing it, for example, publishing $P_5$ using the mass media server 230 or registering $P_5$ with a notary 222 and 224. Checkpointing means that $P_5$ is difficult to tamper with after it has been checkpointed.

Figure 9:
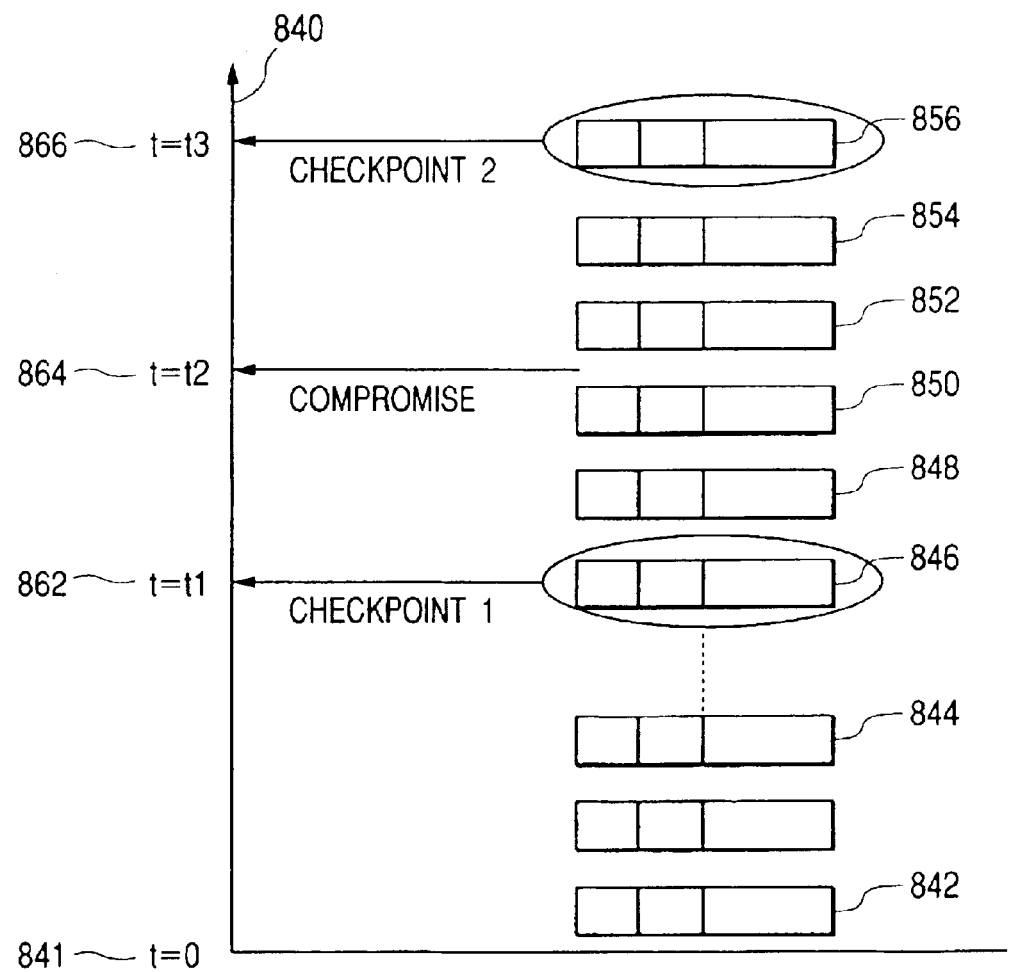
FIG. 9 shows an example of checkpointing of one embodiment of the present invention.

FIG. 9 shows an example of checkpointing of one embodiment of the present invention. The vertical axis 840 represents time and starts at a relative time t=0 841. The first signature log entry 842 has a format similar to $P_n$ in FIG. 6. A subsequent log entry is given by 844. Log entry 846 occurs at time 862 (t=t1) and represent the first checkpoint in this example. This means that log entry 846 may have been published or registered with a notary. Given that 846 is $P_5$ and is checkpointed and that 844 is $P_3$ ($P_4$ is not shown). FIG. 8 may be used to validate $P_3$ and $P_4$. If there is a compromise to the log at time t=t2 864, i.e., between signature log entries 850 and 852, then log entrees 852, 854, and 856 are suspect. Checkpointing 856 at time t=t3 866 does no good as a compromised log entry is being published or registered. Log entries 848 and 850 are still valid. If the compromise is to the message and not the signature log, then the compromise will likely be detected, when back chaining from log entry 856 (Checkpoint 2) to 846 (Checkpoint 1). Thus it is important to secure the user's signature log.

Figure 10:
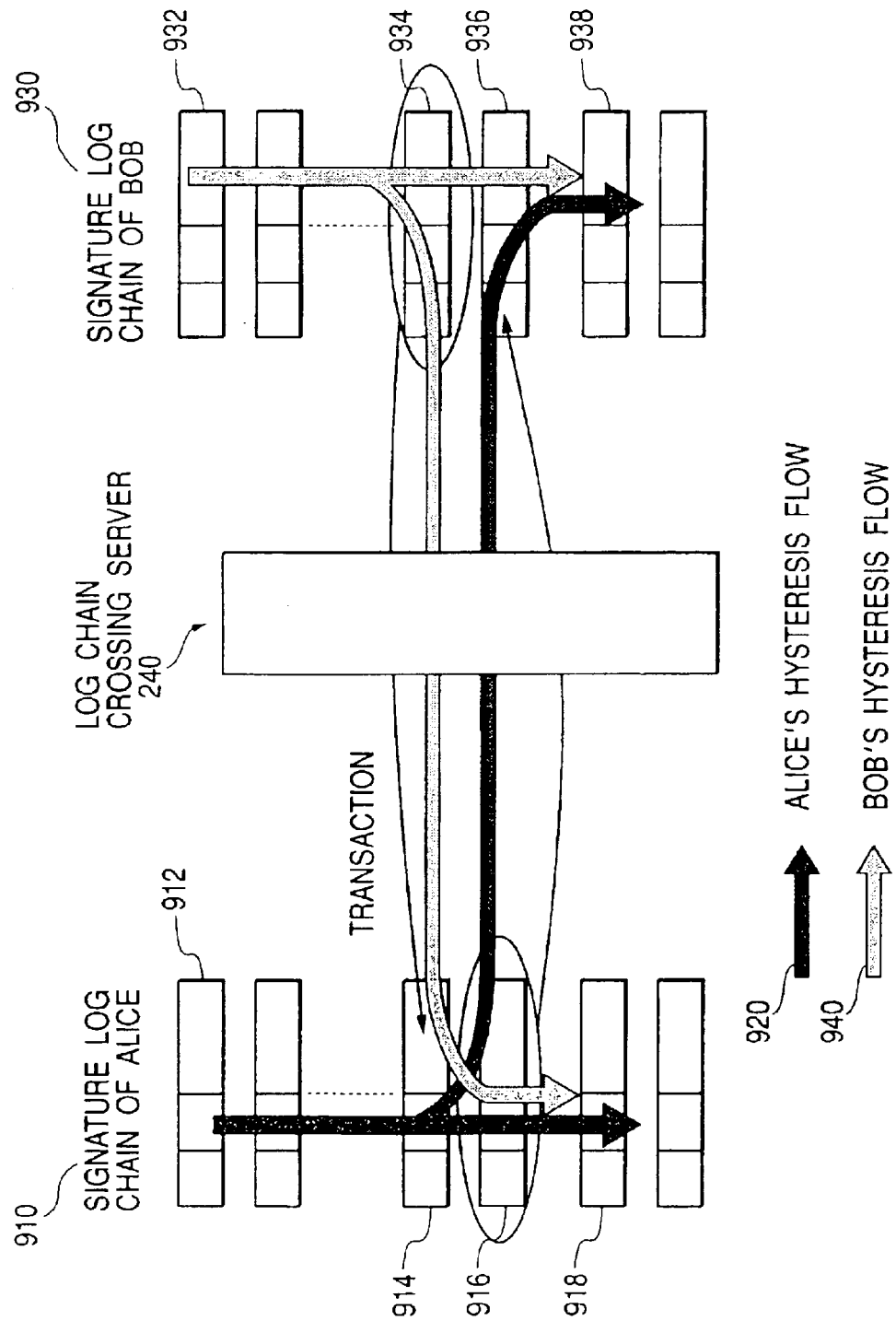
FIG. 10 shows an example of using the Log Chain Crossing Server of an embodiment of the present invention.

FIG. 10 shows an example of using the Log Chain Crossing Server of an embodiment of the present invention. There are two users, Alice and Bob, who wish to conduct a transaction, for example, an offer and an acceptance to the sale of an item. Alice has signature log 910, including log entries 912, 914, 916, and 918, and Bob has signature log 930, including log entries 932, 934, 936, and 938. The legend shows Alice's hysteresis signature flow 920 and Bob's hysteresis signature flow 940. The transaction starts by both Bob and Alice contacting the Log Chain Crossing Server 240 to facilitate the transaction. Bob sends his offer message to Alice via the Log Chain Crossing Server 922. The log entry 934 associated with the offer message, is entered into Bob's signature log 930. The Log Chain Crossing Server 240 upon receipt of the offer from Bob, logs a corresponding signature log entry and sends the offer message on to Alice. Alice, upon receipt of the offer message, logs a log entry 914 in her signature log 910. Alice then sends an acceptance message to the Log Chain Crossing Server 240 with destination of Bob. Alice enters a signature log entry 916 associated with the acceptance message in her signature log 910. Log Chain Crossing Server 240 upon receipt of the acceptance message logs a corresponding signature log entry and passes the message on to Bob. Bob the upon receipt of the acceptance message enters a signature log entry 936 in his signature log 930 and the transaction is complete. Thus there are three places the transaction, i.e., offer and acceptance messages, have log entrees: Alice's log 910, Bob's log 930 and the Log Chain Crossing Server's 240 log. This prevents Alice or Bob from later repudiating the transaction. The Log Chain Crossing Server 240 acts as an impartial witness to the transaction.

Figure 11:
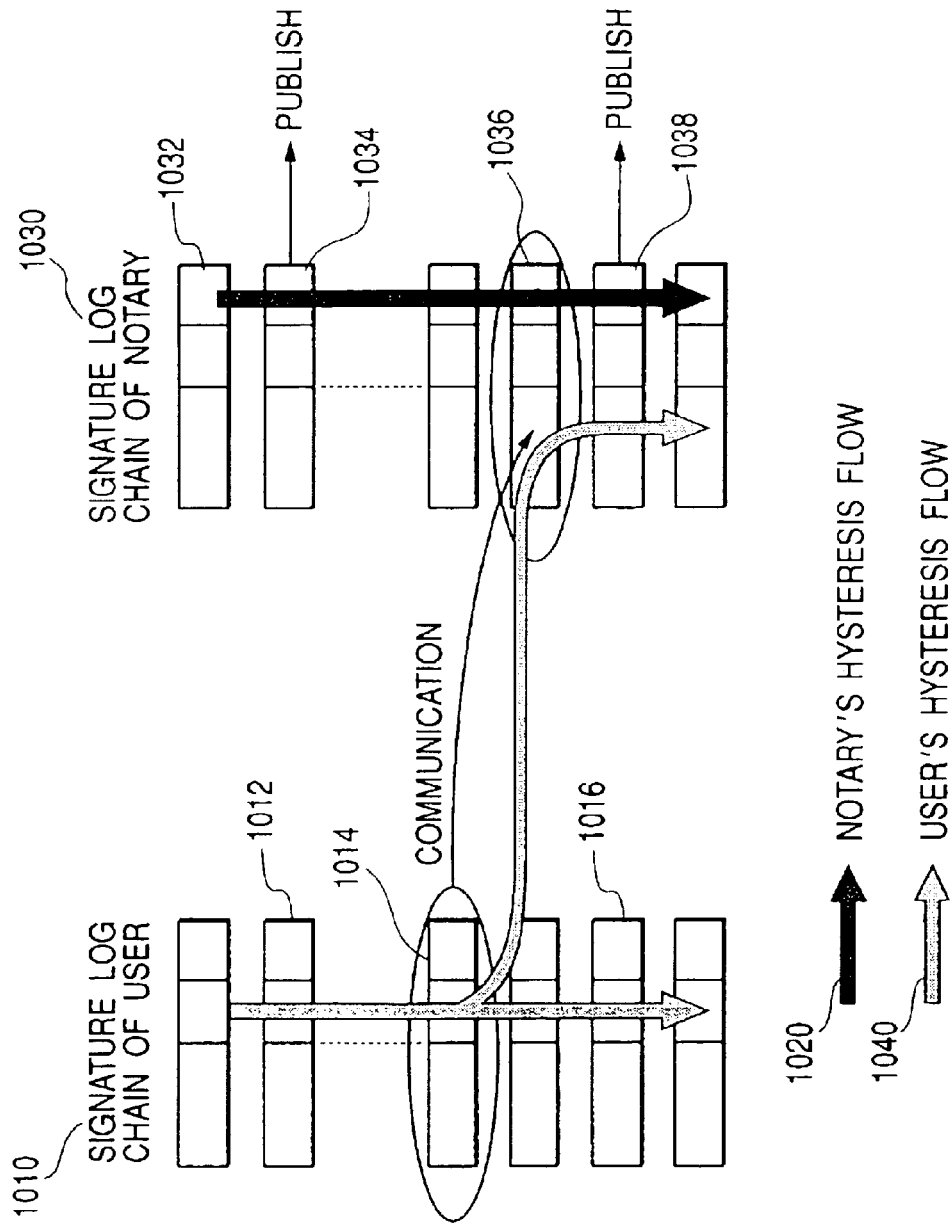
FIG. 11 shows an example of registering a signature log entry with a notary with linking of an embodiment of the present invention.

FIG. 11 shows an example of registering a signature log entry with a notary with linking, i.e., the notary has a hysteresis signature or chaining log 1030. The user has hysteresis signature log 1010, which includes entries 1012, 1014, and 1016. The notary has hysteresis signature log 1030 which includes log entries 1032, 1034, 1036, and 1038. The notary in this embodiment periodically publishes its log entries, for example, entry 1034 and entry 1038, using mass media server 230. The user may register a log entry, for example, entry 1014, by sending the entry 1014 to the notary. The notary then enters the user's log entry 1014 in the notary's signature log 1030 to give entry 1036. Thus the user's log entry becomes part of the log chain of the notary.

Figure 12:
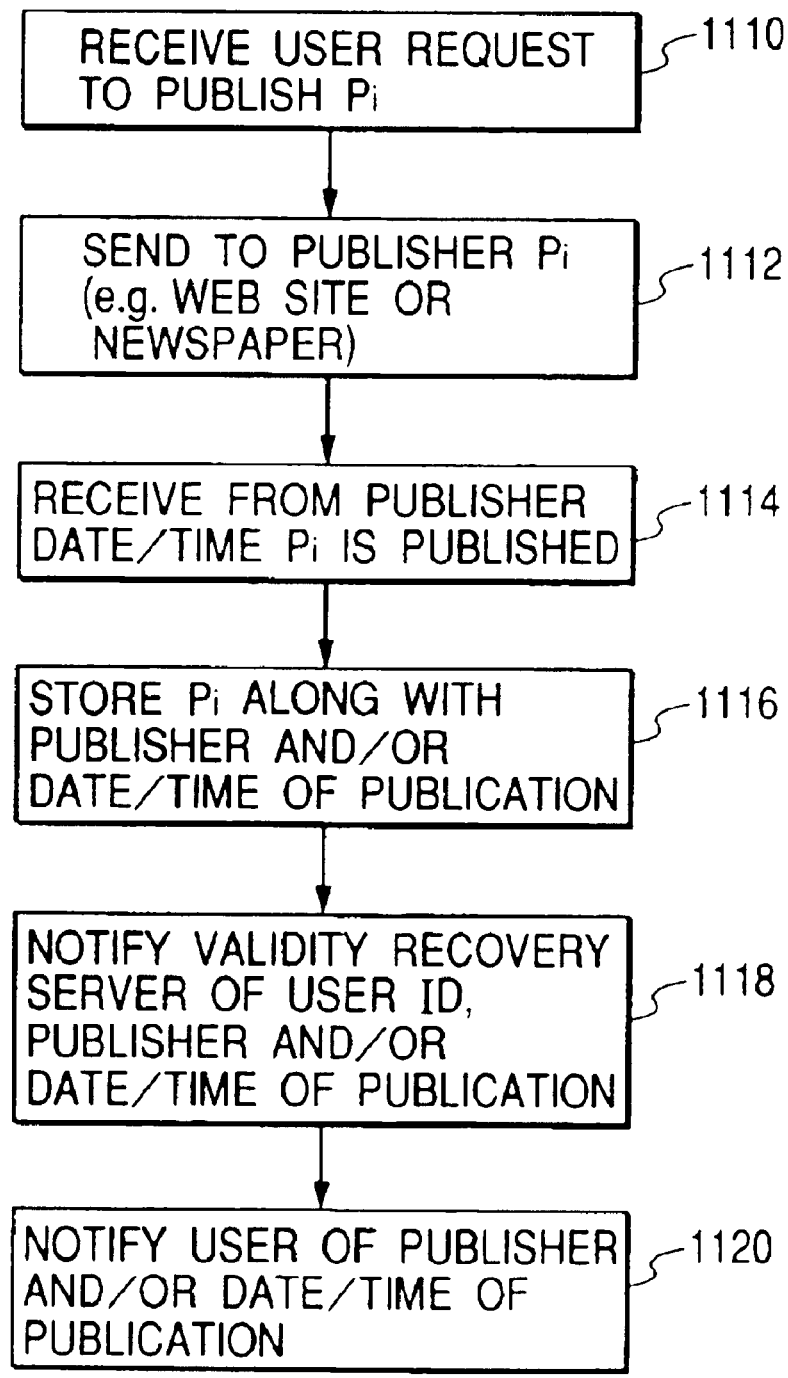
FIG. 12 shows the flowchart for the mass media server 230 of an embodiment of the present invention.

FIG. 12 shows the flowchart for the mass media server 230 of an embodiment of the present invention. At step the 1110 the mass media server 230 receives the user request to publish a user log entry $P_i$. The mass media server 230 then sends to the publisher, for example the Website 234 or the newspaper 232, the log entry item $P_i$. After publication, at step 1114, the mass media server 230 receives from the publisher a timestamp, for example date/time, $P_i$ is published. At step 1116 $P_i$ is stored along with the publisher's ID and/or date/time of publication. At step 1118 the mass media server 230 notifies the Validity Recovery Server 212 of the requesting users ID, the publisher, and/or date/time of publication. And at step 1120 the user is notified of the publisher and/or the date/time of publication.

Figure 13:
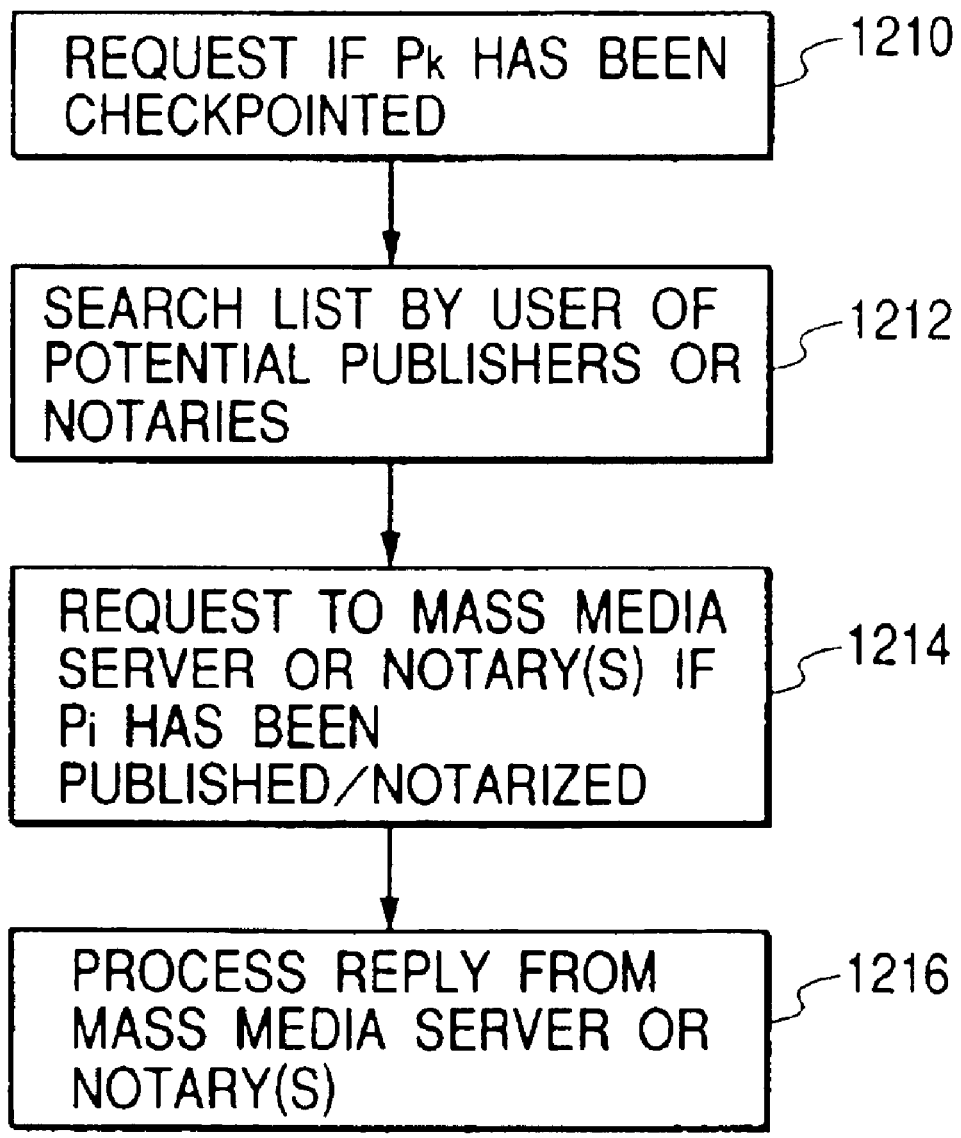
FIG. 13 gives a flow chart showing the validity server determining if a signature log entry has been checkpointed in an embodiment of the present invention.

FIG. 13 gives a flow chart showing the validity server determining if a signature log entry has been checkpointed in an embodiment of the present invention. At step 1210 the Validity Recovery Server 212 receives a request to determine if $P_i$ has been checkpointed. The Validity Recovery Server 212 searches a list indexed by user of potential publishers or notaries (step the 1212). The Validity Recovery Server 212 then sends a request, including any potential publisher or notary identifying information, to the mass media server 230 or notary(s) 222 or 224. The request asks if $P_i$ has been published/notarized. At step 1216, a yes the answer along with the name of the publisher or notary and/or date/time is received from the mass media server. If the answer in no, then only a "not published" answer is returned.

Figure 1:
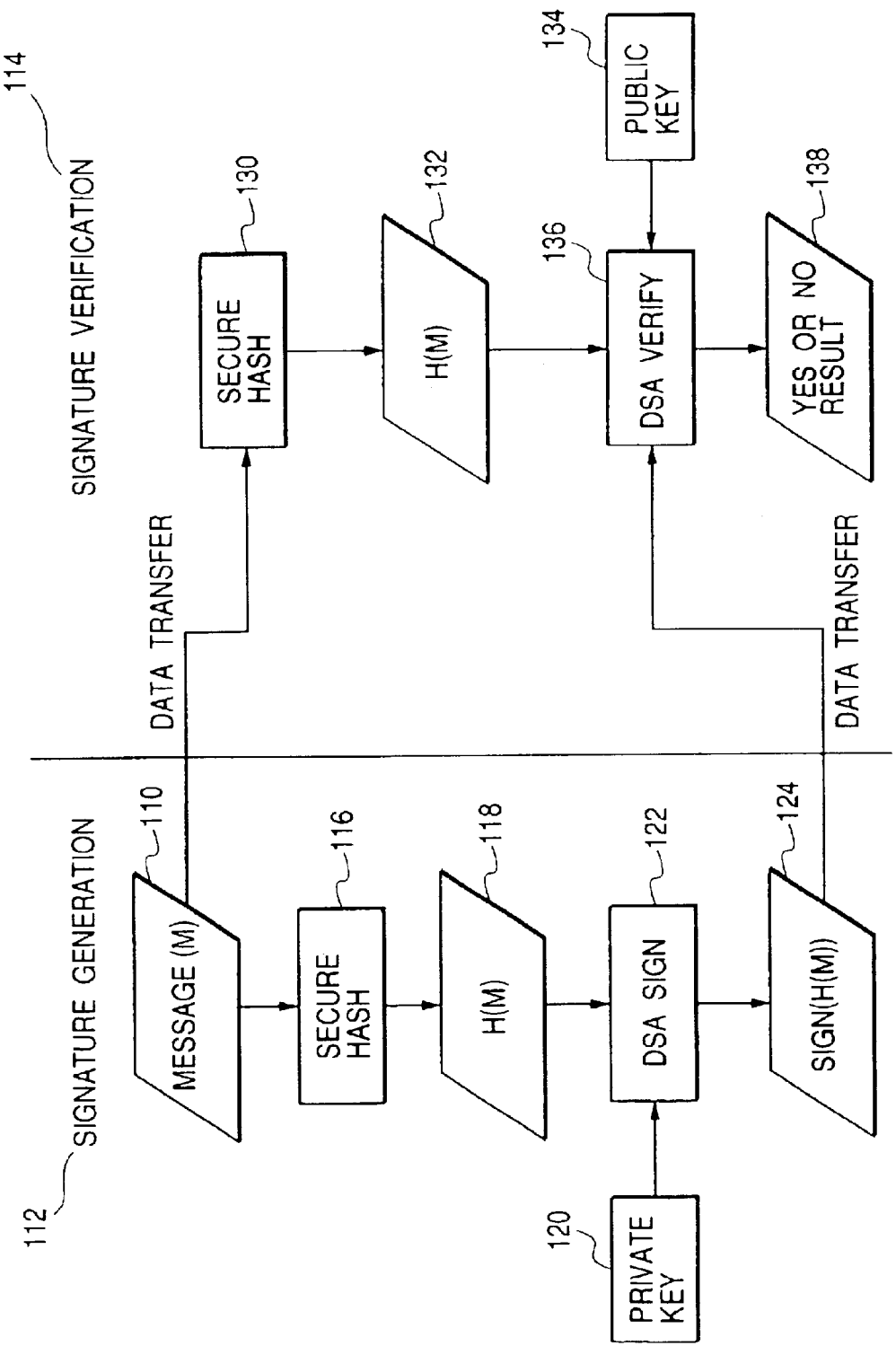
FIG. 1 illustrates a conventional digital signature technique (Prior Art)
Figure 14:
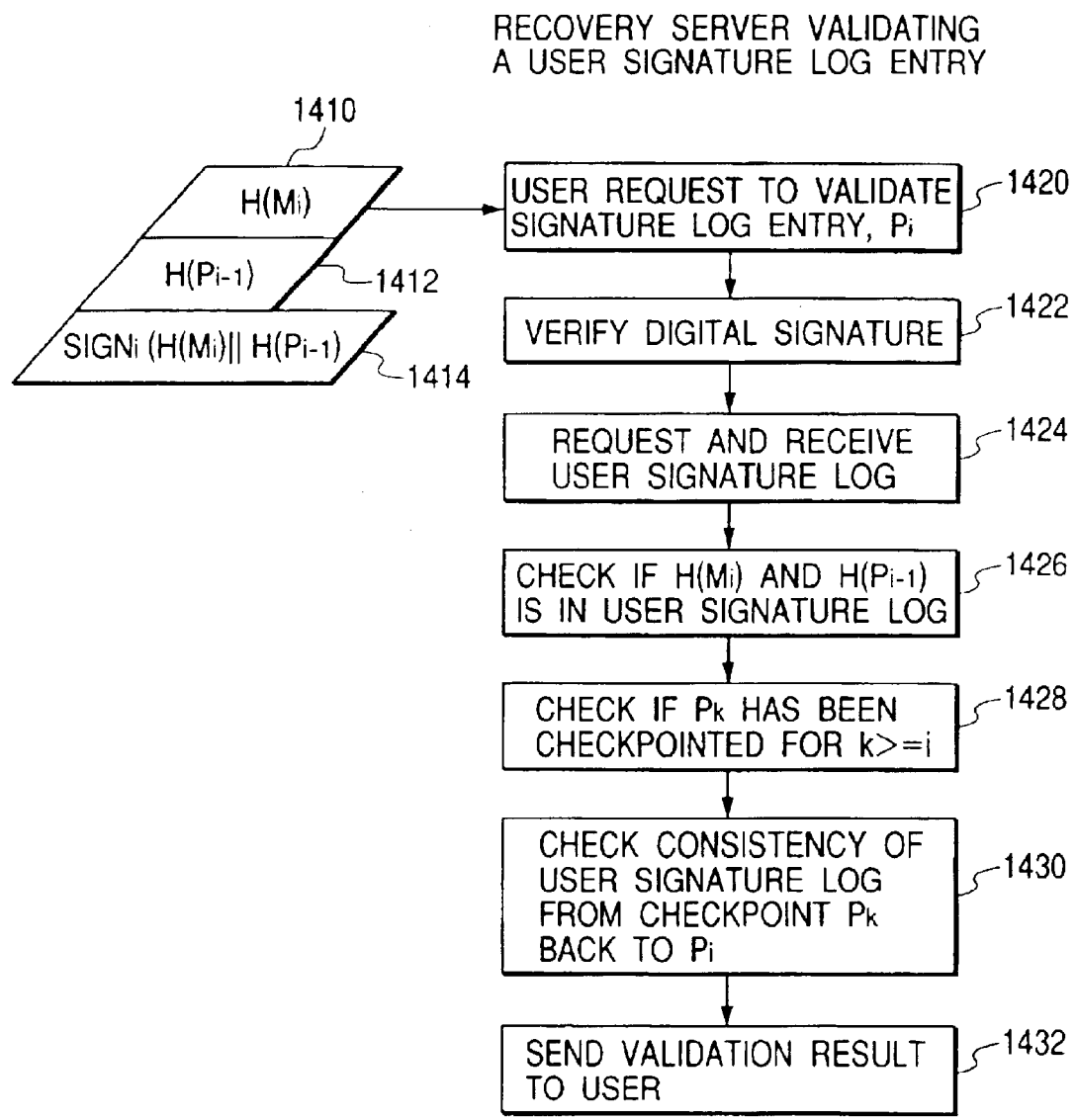
FIG. 14 shows an embodiment of the Validity Recovery Server validating a user signature log entry.

FIG. 14 shows an embodiment of the Validity Recovery Server validating a user signature log entry, $P_i$. At step 1420, the Validity Recovery Server 212 receives a user request to validate signature log entry $P_i$. $P_i$ includes $H(M_i)$ 1410, $H(P_{i-1})$ 1412 and $Sign_i(H(M_i) \| H(P_{i-1}))$ 1414. The Validity Recovery Server 212 first verifies the digital signature (step 1422) by using, for example, DSA verify 136 in FIG. 1. The inputs to DSA verify 136 are $H(M_i)\|H(P_{i-1})$, $Sign_i(H(M_i) \| H(P_{i-1}))$ 1414, and public key 134. If the digital signature is verified (yes result in step 1422), then the Validity Recovery Server 212 requests and receives the user signature log from the user (step 1424). At step 1426, $H(M_i)$ 1410 and $H(P_{i-1})$ 1412 are checked against their corresponding values in the user's signature log. If these hash values are in the log, then at step 1428, a checkpointed $P_k$ is located, were k is greater than or equal to i. The consistency of the user's signature log is checked from checkpoint $P_k$ back to $P_i$ using the flowchart of FIG. 8 (step 1430). If the signature log has not been compromised, a positive validation result is sent to the user (step 1432).

Figure 15:
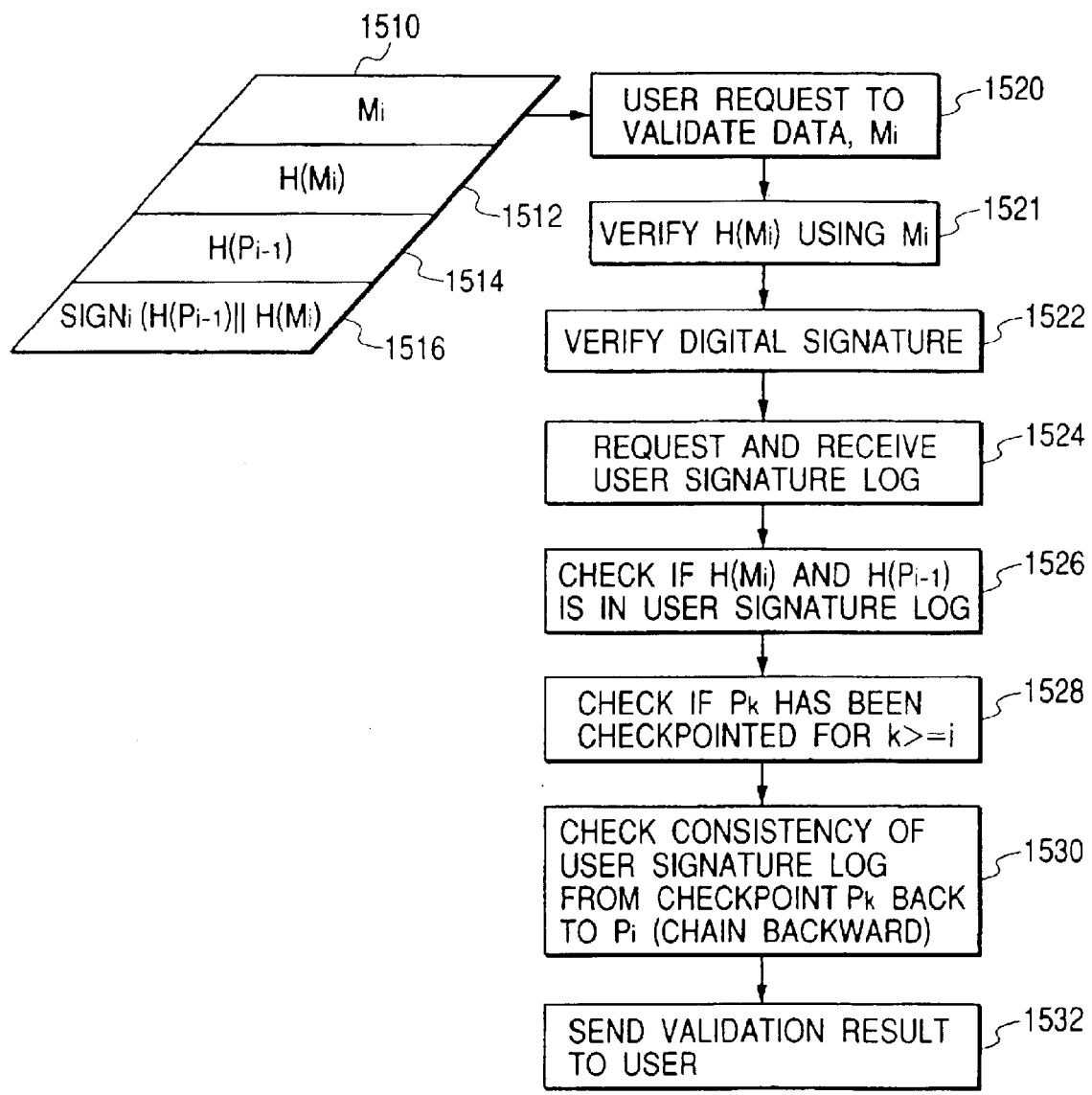
FIG. 15 shows an embodiment of the Validity Recovery Server validating a user message content.

FIG. 15 shows an embodiment of the Validity Recovery Server validating a user message content, $M_i$. At step 1520, the Validity Recovery Server 212 receives a user request to validate data $M_i$. The message includes $M_i$ 1510, $H(M_i)$ 1512, $H(P_{i-1})$ 1514, and $Sign_i(H(M_i) \| H(P_{i-1}))$ 1516. The Validity Recovery Server 212 first calculates the hash of $M_i$ and checks that it is the same as $H(M_1)$ 1512 (step 1521). Second, the digital signature (step 1522) is verified by using, for example, DSA verify 136 in FIG. 1. The inputs to DSA verify 136 are $H(M_i)\|H(P_{i-1})$, $Sign_i(H(M_i) \| H(P_{i-1}))$ 1516, and public key 134. If the digital signature is verified (yes result in step 138), then the Validity Recovery Server 212 requests and receives the user signature log from the user (step 1524). At step 1526, $H(M_i)$ 1512 and $H(P_{i-1})$ 1514 are checked against their corresponding values in the user's signature log. If these hash values are in the log, then at step 1528, a checkpointed $P_k$ is located, were k is greater than or equal to i. The consistency of the user's signature log is checked from checkpoint $P_k$ back to $P_i$ using the flowchart of FIG. 8 (step 1530). If the signature log has not been compromised, a positive validation result on $M_i$ is sent to the user (step 1532).

Table 1 shows a failure and recovery table. The headings of each column are the type of information that may be loss, example causes of the loss, and potential recovery methods. A loss of a signature log entry $P_i$ may be caused by, for example, failure of the storage media. A potential recovery method is to recover the signature log entry from a backup file. If no backup file exists, then a copy of $P_i$, i.e., $H(M_i)$, $H(P_{i-1})$, and $Sign_i(H(M_i), H(P_{i-1}))$, is retrieved from the Evidence Collection Server's 220 DB and the Validity Recovery Server 212 is asked to validate the signature log entry $P_i$ using the procedure given in FIG. 14. When a loss of message content $M_i$ is caused by failure of the storage media or user error, a potential recovery procedure includes restoration from a backup file. And if no backup file exists, then the Evidence Collection Server 220 is asked to retrieve and return message contents $M_i$, and associated signature log entry $P_i$. Then the Validity Recovery Server 212 is asked to validate the message contents $M_i$ using the procedure given in FIG. 15. A data security loss in which the message content or signature log entry is not loss but the validity of the data $M_i$ or a signature log entry $P_i$ is unknown, may be caused by compromise of the user's private key, unauthorized modification or insertion of messages. Assuming that the user or author of the message is honest and that the user signature log maintained by the user, for example, User_1 214, has not been compromised, then a potential recovery procedure includes using the user signature log and associated checkpoints to validate $M_i$ or $P_i$. using the procedures given in FIGS. 14 and 15. If there is a loss of data security due to compromise of the signature log by, for example, user/third party modification or user repudiation of the message, then the recovery is based on the cause. For user tampering and repudiation of transaction messages, the copy of the messages exchanged during the transaction is recovered using the log chain crossing server 240. For third party modification of the user's signature log, the last published/registered signature log entry before the compromise is used. All log entries before this publish/registered signature log entry may be recovered and validated.

| Bit Number | |
|---|---|
| 20 | 1 |
| 010xxxxxxxxxxxxxxxxx | |
| 011xxxxxxxxxxxxxxxxx | |
| 1000000000000000000x | |

Figure 16:
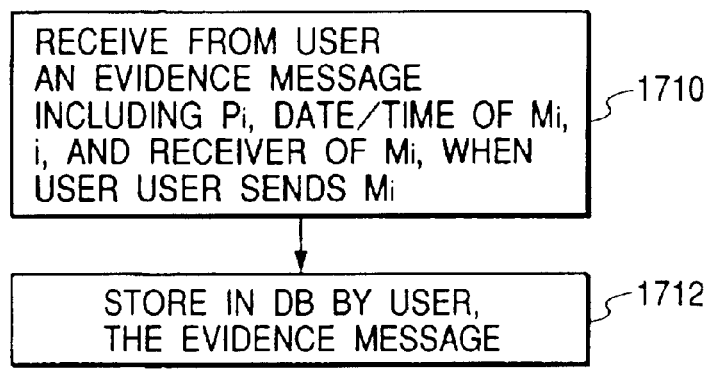
FIG. 16 shows a flowchart of the Evidence Collection Server collecting data in an embodiment of the present invention.

FIG. 16 shows a flowchart of the Evidence Collection Server collecting data in an embodiment of the present invention. At step 1710 the Evidence Collection Server 220 receives from a user an evidence message. The evidence message includes one or more of the following: $P_i$, date/time of $M_i$, the index I, the address or ID of the sender of $M_i$, the address or ID of the receiver of $M_i$, or when the user sends. In an alternate embodiment the evidence message is of the format given in either FIG. 4 or 5. At step 1712 the evidence message will be stored in the Evidence Collection Server's database(DB) indexed by user address or ID.

Figure 17:
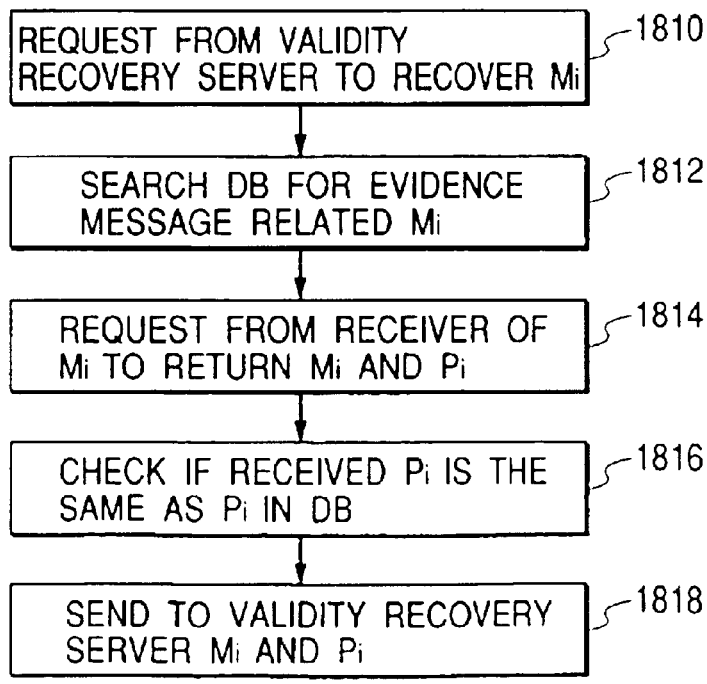
FIG. 17 shows a flowchart of the Evidence Collection Server recovering data in an embodiment of the present invention.

FIG. 17 shows a flowchart of the Evidence Collection Server recovering data in an embodiment of the present invention. At step 1810 the Evidence Collection Server 220 receives a request from the Validity Recovery Server 212 to recover message content $M_i$. At step 1812 the Evidence Collection Server 220 searches its database for an evidence message related to $M_i$. At step 1814 the Evidence Collection Server 220 then requests from the user who has received $M_i$ to return a copy of $M_i$ and the $P_i$ to the Evidence Collection Server. In an alternate embodiment the Evidence Collection Server 220 has a copy of $M_i$ and the $P_i$ already stored in its DB and uses these copies. In yet another embodiment the Evidence Collection Server has $P_i$ and does a search of the network 210 to recover $M_i$. Next $P_i$ is checked to see if the received $P_i$ is the same has the $P_i$ in the Evidence Collection Server's database (step 1816). If $P_i$ is in the DB then at step 1818, $M_i$ and $P_i$ are sent to the Validity Recovery Server 212 for validation.

Figure 18:
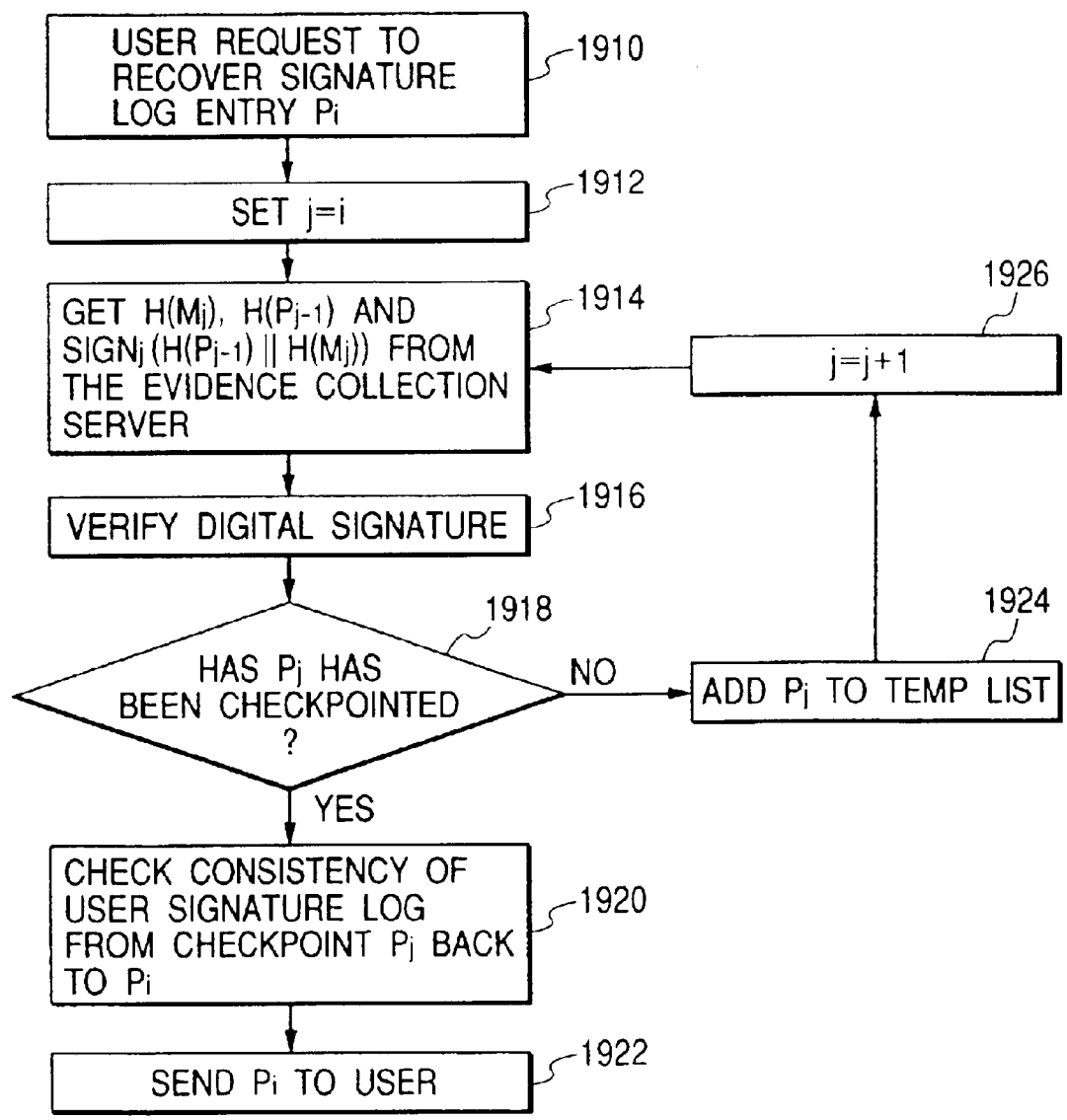
FIG. 18 shows a flowchart of the Validity Recovery Server recovering a user signature log entry in another embodiment of the present invention.

FIG. 18 shows a flowchart of the Validity Recovery Server recovering a user signature log entry in another embodiment of the present invention. At step 1910 a user, for example, User_1 214, makes a request to the Validity Recovery Server 212 to recover a signature log entry $P_i$. At step 1912 a temporary variable "j" is set equal to i. Next at step 1914, a request is made to the Evidence Collection Server 220 to get and return $P_j$. The Validity Recovery Server 212 then verifies the digital signature of $P_j$ using the procedure given in FIG. 1 with $(H(P_{i-1})\|H(M_i))$ in place of $H(M)$ (Step to 1916). At step 1918 $P_j$ is checked to see if it has been checkpointed. If the answer is yes then at step 1920 the consistency of the user signature log is checked from checkpoint $P_j$ back to signature log entry $P_i$ using the procedure given in FIG. 8. And if $P_i$ in the user's signature log has not been compromised, $P_i$ is returned to the user at step 1922. If the answer of step 1918 is no, then $P_j$ is entered to a temporary sequential list or queue of log entries (step 1924), j is incremented by one (step 1926) and the steps 1914 through 1918 are repeated. Once a $P_j$ is found that has been checkpointed the list, which includes the chained log entrees, is used in step 1920 to check the consistency of log entrees from $P_j$ back to $P_i$.

Figure 19:
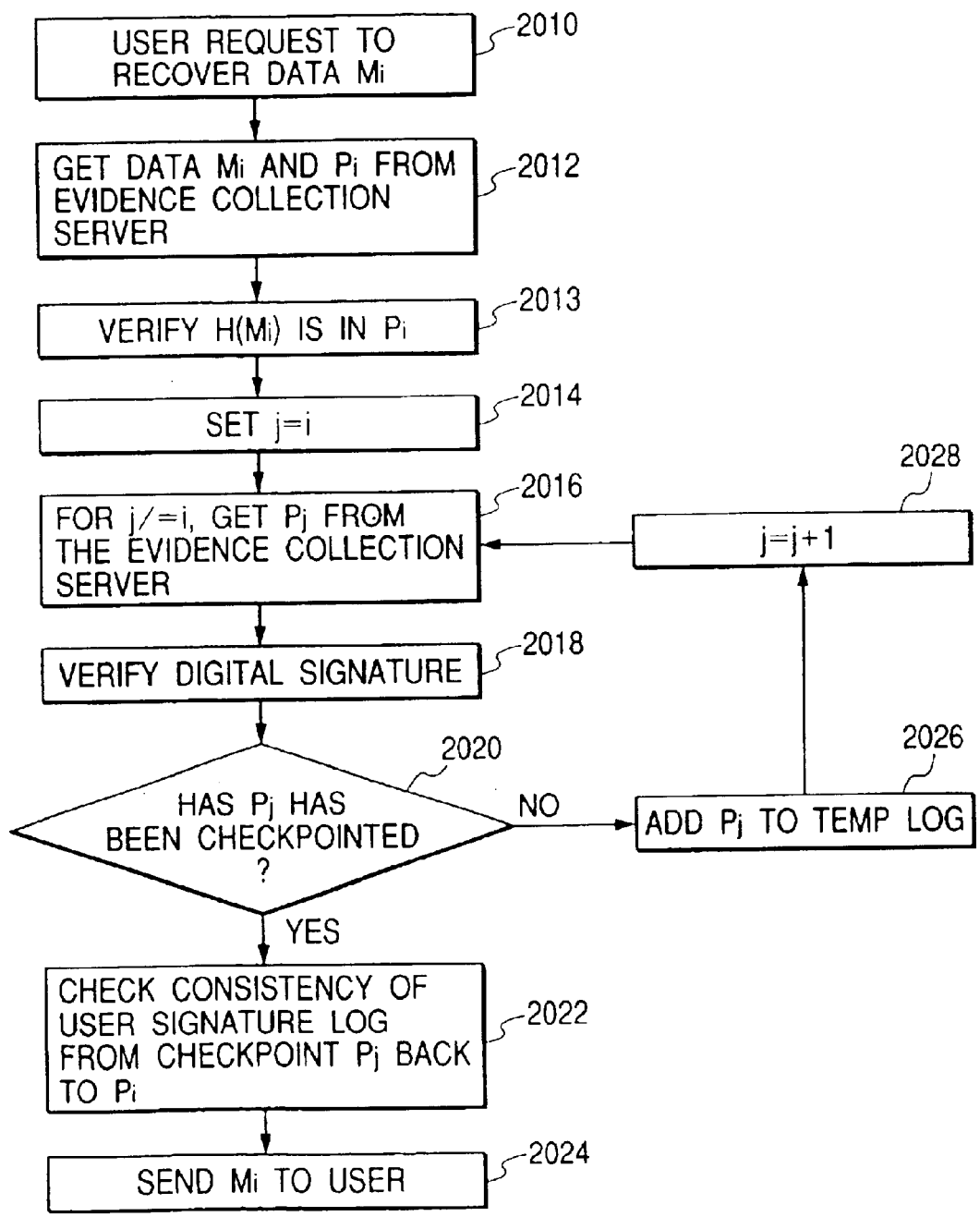
FIG. 19 shows a flowchart of the Validity Recovery Server recovering a user message in another embodiment of the present invention.

FIG. 19 shows a flowchart of the Validity Recovery Server recovering a user message in another embodiment of the present invention. At step 2010 a user, for example, User_1 214, makes a request to the Validity Recovery Server 212 to recover message contents $M_i$. Next at step 2012, a request is made to the Evidence Collection Server 220 to get and return $M_i$ and associated signature log entry $P_i$. At step 2013 the hash of $M_i$ is verified to be in $P_i$. At step 2014 a temporary variable "j" is set equal to "i". At step 2016, a request is made to the Evidence Collection Server 220 to get and return $P_j$ ( this step is skipped when i=j, as $P_i$ was previous gotten in step 2012). The Validity Recovery Server 212 then verifies the digital signature of $P_j$ using the procedure given in FIG. 1 with $(H(P_{i-1})\|H(M_i))$ in place of $H(M)$ (Step to 2018). At step 2020, $P_j$ is checked to see if it has been checkpointed. If the answer is yes then at step 2022, the consistency of the user signature log is checked from checkpoint $P_j$ back to signature log entry $P_i$ using the procedure given in FIG. 8. And if $P_i$ in the user's signature log has not been compromised, $M_i$ is returned to the user at step 2024. If the answer of step 2020 is no, then $P_j$ is entered to a temporary sequential list or queue of log entries (step 2026), j is incremented by one (step 2028) and the steps 2016 through 2020 are repeated. Once a $P_j$ is found that has been checkpointed the list, which includes the chained log entrees, is used in step 2022 to check the consistency of log entrees from $P_j$ back to $P_i$.

Figure 20:
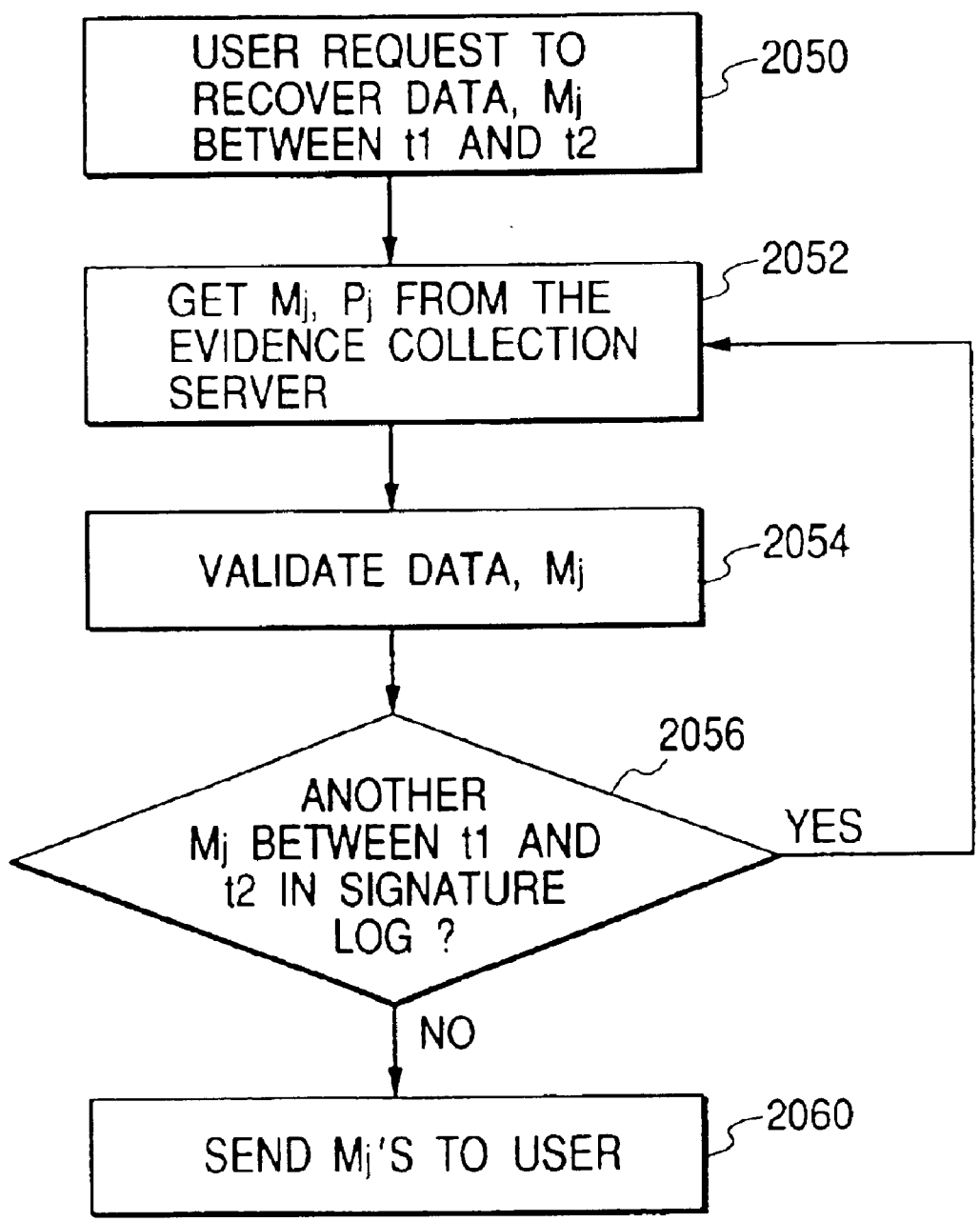
FIG. 20 shows a flowchart of the Validity Recovery Server recovering user messages between two points in time of another embodiment of the present invention.

FIG. 20 shows a flowchart of the Validity Recovery Server recovering user messages between two points in time of another embodiment of the present invention. In this embodiment user messages are in the format of FIG. 5, where there is a timestamp field 524. At step 2050 the user sends a request to the Validity Recovery Server 212 to recover messages $M_j$ between time t1 and time t2. The Validity Recovery Server 212 requests a $M_j$ and associated $P_j$ from the Evidence Collection Server 220 (step 2052). At step 2054, the Validity Recovery Server 212 validates $M_j$ using the procedure in FIG. 15. At step 2056 the Validity Recovery Server 212 or Evidence Collection Server 220, checks if there is another $M_j$ between t1 and t2. If there is, steps 2052 to 2056 are repeated. If the answer is no, then, at step 2060, the $M_j$'s are sent to the user. In another embodiment the $M_j$'s may be gotten in a batch from the Evidence Collection Server. Thus step 2052 would be a batch request to the Evidence Collection Server 220 to return all $M_j$'s between t1 and t2, and steps 2054 and 2056 would not be needed.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

What is claimed is:

1. A method for validating a restored message, comprising:
    generating an entry in a signature log for a message, wherein said entry comprises cryptographic information associated with said message and at least one previous message associated with said message;
    if said message is lost, generating said restored message responsive to a request; and
    validating said restored message using cryptographic information associated with said previous message in said signature log.

2. The method of claim 1 wherein said signature log comprises a hysteresis signature.

3. The method of claim 1 wherein said cryptographic information comprises a digital signature.

4. The method of claim 3 wherein said digital signature is generated using information from a previous signature log entry.

5. A system for recovering and validating user information, comprising:
    a user system comprising a signature log, said signature log comprising cryptographic information associated with said user information and at least one previous version of said user information;
    a recovery system coupled with said user system via a communications network for restoring user information; and
    a validity system coupled with said user system via said communications network for validating restored user information using said at least one previous version of said user information in said signature log.

6. The system of claim 5 wherein said user in information comprises a log entry of said signature log.

7. The system of claim 5 wherein said user in information comprises a user message.

8. The system of claim 5 wherein said cryptographic information comprises a hash value.

9. The system of claim 5 wherein said signature log comprises a first log entry of said signature log determined in part by a second log entry of said signature log.

10. A system for determining if a user message is valid, said system comprising:
   a user computer system having a log, said log comprising a log entry related to a message sent by said user, wherein said log entry has a digital signature comprising information related to a previous log entry of said log; and
   a validation unit coupled to said user computer system for validating said user message using said previous log entry of said log.

11. The system of claim 10 further comprising a collection unit responsive to said validation unit for retrieving said user message, when said user message is lost.

12. The system of claim 10 further comprising a collection unit responsive to said validation unit for retrieving a copy of said message from receiver of said message, when said user message is lost.

13. The system of claim 10 further comprising a publication unit for publishing a selected log entry of said log.

14. The system of claim 13 wherein said selected log entry is used in validating said user message.

15. The system of claim 13 wherein publication unit is selected from a group consisting of a newspaper publisher or a Web site.

16. The system of claim 10 further comprising a notary unit for registering a selected log entry of said log.

17. The system of claim 10 further comprising a log chain crossing unit coupled to said user computer system and a second user computer system for recording transactions between said user computer system and said second user computer system.

18. The system of claim 10 further comprising a log chain crossing unit coupled to said user computer system and a second user computer system for facilitating transactions between said user computer system and said second user computer system.

19. A computer readable data transmission medium containing a data structure for validating message information comprising:
   a first portion having a hash of a user message;
   a second portion having a hash of a signature log entry that includes a hash of at least one previous user message that is associated with the user message; and
   a digital signature based on said first portion and said second portion.

20. The computer readable data transmission medium of claim 19 wherein said signature log entry is related to another user message prior to said user message.

21. The computer readable data transmission medium of claim 19 further comprising a third portion having a timestamp.

22. A method, using a computer, for generating a signature log comprising a plurality of log entries, said method comprising:
   generating a first log entry of said plurality of log entries, said first log entry comprising a first cryptographic value associated with a first user message; and
   generating a second log entry of said plurality of log entries, said second log entry comprising a second cryptographic value associated with said first log entry, a third cryptographic value associated with a second user message, and a digital signature.

23. The method of claim 22 wherein said digit signature is formed using information including said second cryptographic value and said third cryptographic value.

24. The method of claim 22 wherein said second cryptographic value is a hash of said first log entry.

25. The method of claim 22 wherein said second log entry further comprises a timestamp.

26. A data structure stored in a computer readable medium for validating a selected user message of a plurality of user messages, comprising
   a first hash of a first log entry, wherein said first log entry comprises a second hash of a first user message of said plurality of user messages;
   a third hash of said selected user message of said plurality of user messages; and
   a digital signature of said first hash combined with said third hash.

27. A computerized method for validating a selected log entry using a signature log having a plurality of recorded log entries, said method comprising:
   computing a cryptographic value for said selected log entry; and
   determining if said cryptographic value is part of a later recorded log entry of said plurality of recorded log entries.

28. The method of claim 27 wherein said selected log entry corresponds to a second recorded log entry of said plurality of recorded log entries sequentially prior to said first recorded log entry.

29. A system for preventing repudiation of a transaction by one of a plurality of user computer systems, said system comprising:
   a first user of said plurality of user computer systems;
   a second user of said plurality of user computer systems performing said transaction with said first user; and
   a log chain crossing computer responsive to a request by either said first or said second user to record said transaction, said record comprising a hysteresis signature of said transaction.

30. A computerized method for registering a log entry of a user with an officially recognized entity, comprising:
   registering a signature log chain with said officially recognized entity, wherein a first log entry of said signature log chain is related to a previous second log entry of said signature log chain;
   receiving from said user a user log entry;
   generating a cryptographic value associated with said user log entry; and
   generating a third log entry in said signature log chain, wherein said third log entry comprises said cryptographic value and cryptographic information for the second log entry and the first log entry.

31. The method of claim 30 wherein a selected log entry of said signature log chain is published.

32. The method of claim 30 wherein said officially recognized entity is a notary.

33. A method for validating a user data item by a computer system using a user's signature log, comprising:
   receiving said user's signature log;
   validating a cryptographic value associated with said user data item is in a first log entry in said user's signature log;

determining a second log entry in said user's signature log that is checkpointed;

verifying said first log entry by back chaining from said second log entry to said first log entry; and returning a result to said user.

34. A computer method for recovering a data item recorded in a signature log between two points in time comprising:

receiving a request from a user to recover data recorded in a signature log between two points in time;

receiving from a data recovery unit said data item and a first signature log entry that includes said data item;

receiving from the data recovery unit a second signature log entry entered in the signature log after the first signature log entry is entered in the signature log, wherein the second signature log entry includes another data item associated with said data item;

validating that a hash of said data item is included in said second log entry; and if said data item is validated, sending said data item to said user.

35. A system for validating a user message, comprising:

an input module for receiving a signature log from a user, said signature log comprising a plurality of related log entries;

a cryptographic module for generating a cryptographic value from said user message; and a verifying module for validating said cryptographic value is in a later log entry in said signature log.

36. The system of claim 35 further comprising a log verifying module for determining if a first log entry of said plurality of related log entries is compromised, said determining comprising:

selecting a second log entry of said plurality of related log entries subsequent to said first log entry;

hashing said first log entry to give a hash value; and validating said hash value is part of said second log entry.

37. A computer program product for validating a restored message, comprising:

code for generating an entry in a signature log for a message, wherein said entry comprises cryptographic information associated with said message and at least one previous massage associated with said message;

if said message is lost, code for generating said restored message responsive to a request;

code for validating said restored message using cryptographic information associated with said previous message in said signature log; and a computer usable medium for embodying said codes.

38. The computer program product of claim 37 wherein said computer usable medium is a storage medium.

39. The computer program product of claim 37 wherein said computer usable medium is a carrier wave.

40. A computer data signal embodied in a carrier wave for validating a restored message, comprising:

program code for generating an entry in a signature log for a message, wherein said entry comprises cryptographic information associated with said message and at least one previous message associated with said message;

if said message is lost, program code for generating said restored message responsive to a request; and program code for validating said restored message using cryptographic information associated with said previous message in said signature log.

* * * * *